(12) United States Patent
Murata et al.

(10) Patent No.: US 8,938,691 B2
(45) Date of Patent: Jan. 20, 2015

(54) IMAGING PROCESSING APPARATUS, IMAGE PROCESSING SYSTEM AND IMAGE PROCESSING PROGRAM

(75) Inventors: Akikazu Murata, Gifu-ken (JP); Hirofumi Oguri, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1240 days.

(21) Appl. No.: 12/353,886

(22) Filed: Jan. 14, 2009

(65) Prior Publication Data
US 2009/0183116 A1 Jul. 16, 2009

(30) Foreign Application Priority Data
Jan. 14, 2008 (JP) .................. 2008-005101

(51) Int. Cl.
*G06F 3/048* (2013.01)
*H04N 1/00* (2006.01)

(52) U.S. Cl.
CPC ....... *H04N 1/00413* (2013.01); *H04N 1/00389* (2013.01); *H04N 1/00427* (2013.01); *H04N 1/00474* (2013.01); *H04N 1/00517* (2013.01); *H04N 2201/0094* (2013.01)
USPC ........... 715/810; 715/746; 715/756; 715/770; 715/839

(58) Field of Classification Search
CPC ... G06F 3/1259; G06F 3/1275; G06F 3/1285; G06F 3/1288; G06F 21/608; G06F 3/1229; G06F 3/1284
USPC ........................................ 715/810
See application file for complete search history.

(56) References Cited

U.S. PATENT DOCUMENTS 6,980,312 B1 * 12/2005 Czyszczewski et al. ..... 358/1.15
2004/0153530 A1 * 8/2004 Machida ..................... 709/220

(Continued)

FOREIGN PATENT DOCUMENTS

JP H06-062202 A 3/1994
JP 2002-132100 A 5/2002

(Continued)

OTHER PUBLICATIONS

Kingman et al., Operational image systems: A new opportunity; IBM system Journal; vol. 29, No. 3; 1990; 9 pages.*

(Continued)

*Primary Examiner* — Linh K Pham
(74) *Attorney, Agent, or Firm* — Merchant & Gould PC

(57) ABSTRACT

An image processing apparatus is provided. The image processing apparatus is capable of executing a plurality of processing operations on input data and includes: a selection detecting unit configured to detect a selecting operation of a plurality of processing operations from among the plurality of processing operations; an operation information storing unit configured to store a plurality of processing operation information for specifying the processing operations detected by the selection detecting unit, respectively; a setting unit configured to set the plurality of processing operation information stored in the operation information storing unit, as a plurality of processing operations which are collectively executed in response to an execution instruction input to an instructing unit; and an executing unit configured to execute the plurality of processing operations corresponding to the plurality of processing operation information set by the setting unit, in response to the execution instruction.

18 Claims, 26 Drawing Sheets

(56) References Cited

U.S. PATENT DOCUMENTS

| | | | |
|---|---|---|---|
| 2004/0170443 A1* | 9/2004 | Maeshima | 399/82 |
| 2005/0111866 A1* | 5/2005 | Sato | 399/79 |
| 2006/0034630 A1* | 2/2006 | Yabe | 399/82 |
| 2006/0055968 A1* | 3/2006 | Sato et al. | 358/1.15 |
| 2006/0083533 A1* | 4/2006 | Maeshima | 399/82 |
| 2006/0087680 A1* | 4/2006 | Maeda | 358/1.15 |
| 2006/0187483 A1* | 8/2006 | Baba | 358/1.15 |
| 2007/0201071 A1* | 8/2007 | Yamada et al. | 358/1.13 |
| 2007/0279667 A1* | 12/2007 | Hattori et al. | 358/1.13 |
| 2008/0291485 A1* | 11/2008 | Kimoto et al. | 358/1.15 |
| 2008/0309988 A1* | 12/2008 | Johnson et al. | 358/462 |
| 2009/0128859 A1* | 5/2009 | Daos et al. | 358/3.28 |
| 2011/0261399 A1 | 10/2011 | Hattori et al. | |

FOREIGN PATENT DOCUMENTS

| | | |
|---|---|---|
| JP | 2006-041890 A | 2/2006 |
| JP | 2007-248524 A | 9/2007 |
| JP | 2007-318685 A | 12/2007 |

OTHER PUBLICATIONS

Japan Patent Office, Notification of Reasons for Refusal for Japanese Patent Application No. 2008-005101 (counterpart to above-captioned patent application), dispatched Nov. 1, 2011.

* cited by examiner

FIG. 4

| | | |
|---|---|---|
| | usr1_func(1) | scan_card |
| | usr1_func(2) | to_pc |
| usr1_tbl | usr1_func(3) | to_print |
| | usr1_func(4) | |
| | usr1_func(5) | |
| | usr2_func(1) | |
| | usr2_func(2) | |
| usr2_tbl | usr2_func(3) | |
| | usr2_func(4) | |
| | usr2_func(5) | |
| | usr3_func(1) | |
| | usr3_func(2) | |
| usr3_tbl | usr3_func(3) | |
| | usr3_func(4) | |
| | usr3_func(5) | |

FIG. 5
| usr_tbl_tmp | usr1_func(1) | scan_card |
|---|---|---|
| | usr1_func(2) | |
| | usr1_func(3) | |
| | usr1_func(4) | |
| | usr1_func(5) | |
| usr_tbl_tmp | usr1_func(1) | scan_to_card |
|---|---|---|
| | usr1_func(2) | to_pc |
| | usr1_func(3) | |
| | usr1_func(4) | |
| | usr1_func(5) | |
| usr_tbl_tmp | usr1_func(1) | scan_to_card |
|---|---|---|
| | usr1_func(2) | to_pc |
| | usr1_func(3) | |
| | usr1_func(4) | |
| | usr1_func(5) | to_print |

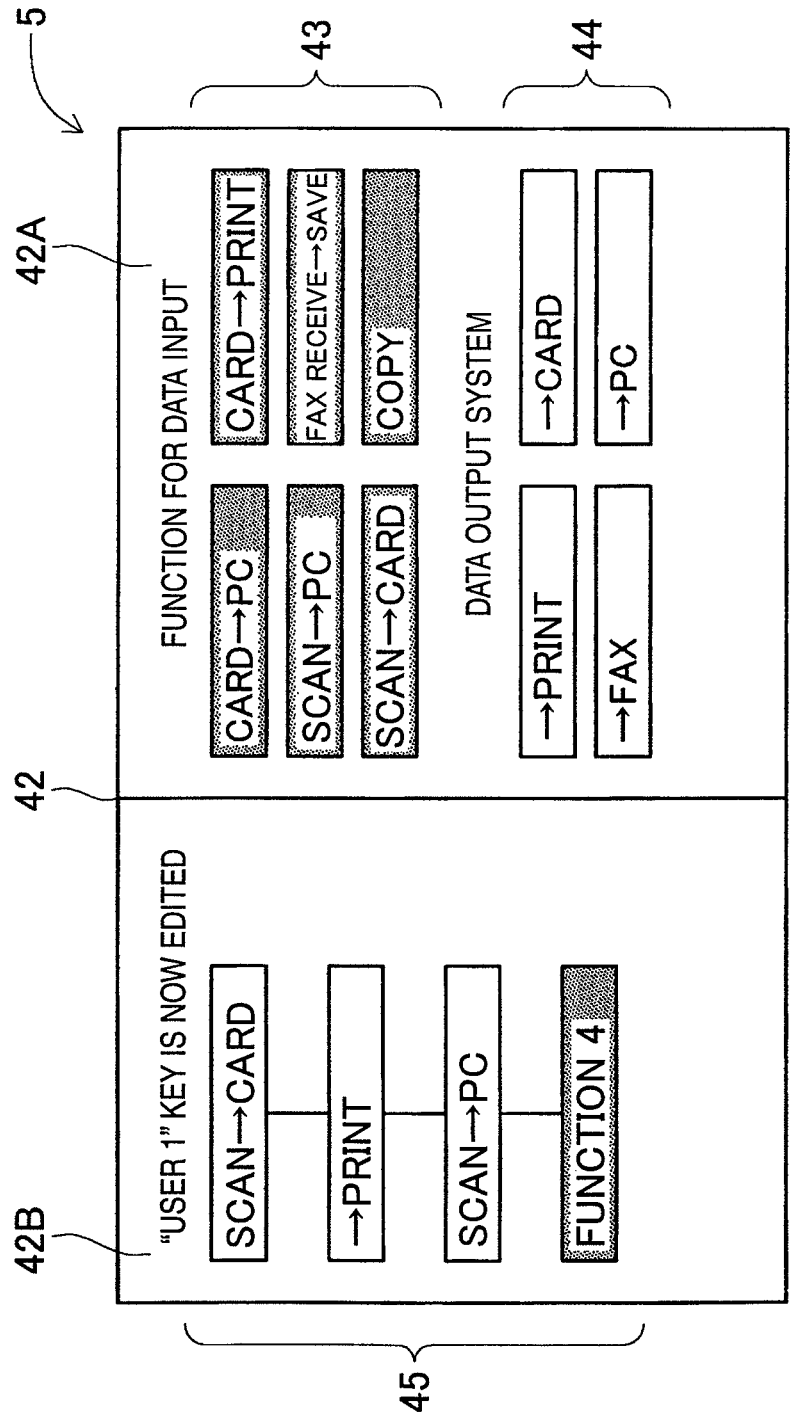

IMAGING PROCESSING APPARATUS, IMAGE PROCESSING SYSTEM AND IMAGE PROCESSING PROGRAM

CROSS-REFERENCE TO RELATED APPLICATION

This application claims priority from Japanese Patent Application No. 2008-005101, filed on Jan. 14, 2008, the entire subject matter of which is incorporated herein by reference.

TECHNICAL FIELD

Aspects of the present invention relate to an image processing apparatus, an image processing system, and an image processing program.

BACKGROUND

For example, Japanese Patent Application Publication No. 2006-41890 describes an image forming apparatus capable of executing a plurality of functions by a single image reading operation in response to a user's simple operating instruction to an operating portion of the image forming apparatus.

In the image forming apparatus described in the Publication, an operation key used to execute two or more functions is provided to the operating portion. According to the image forming apparatus described in the Publication, in response to that the user performs a simple operation such as pressing the operation key, two or more functions can be carried out by one image reading operation at the image reading portion.

In the above image forming apparatus, operation keys provided to execute continuously two or more predetermined functions, e.g., a "scanner+copy mode key" or a "FAX+scanner+copy mode key" are provided.

Therefore, in the above image forming apparatus, in some cases, two or more functions that the user intends to execute do not match two or more functions that are executable by using the operation key.

If two or more functions that the user intends to execute do not match two or more functions that are executable by using the operation key, the user has to make a plurality of operations to execute individually two or more functions that the user intends to execute.

As a result, in the above image forming apparatus, in some cases, the operation key provided to execute continuously two or more predetermined functions cannot be utilized effectively and thus the usability becomes worse.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image processing apparatus, an image processing system, and an image processing program capable of combining freely two or more functions according to user's preference and thus improving usability.

According to an exemplary embodiment of the present invention, there is provided an image processing apparatus capable of executing a plurality of processing operations on input data, the apparatus including: a selection detecting unit configured to detect a selecting operation of a plurality of processing operations from among the plurality of processing operations; an operation information storing unit configured to store a plurality of processing operation information for specifying the processing operations detected by the selection detecting unit, respectively; a setting unit configured to set the plurality of processing, operation information stored in the operation information storing unit, as a plurality of processing operations which are collectively executed in response to an execution instruction input to an instructing unit; and an executing unit configured to execute the plurality of processing operations corresponding to the plurality of processing operation information set by the setting unit, in response to the execution instruction.

According to an exemplary embodiment of the present invention, there is provided an image processing system including: an information processing apparatus; and an image processing apparatus capable of communicating with the information processing apparatus and capable of executing a plurality of processing operations on input data. The information processing apparatus includes: a selection detecting unit configured to detect a selecting operation of a plurality of processing operation from among the plurality of processing operations; an operation information storing unit configured to store a plurality of processing operation information for specifying the processing operations detected by the selection detecting unit, respectively; and a transmitting unit configured to transmit the plurality of processing operation information stored in the operation information storing unit to the image processing apparatus. The image processing apparatus includes: a receiving unit configured to receive the plurality of processing operation information transmitted by the transmitting unit; a setting unit configured to set the plurality of processing operation information received by the receiving unit as a plurality of processing operations which are collectively executed in response to an execution instruction input to an instructing unit; and an executing unit configured to execute the plurality of processing operations corresponding to the plurality of operation information set by the setting unit, in response to the execution instruction.

According to an exemplary embodiment of the present invention, there is provided a computer-readable medium having a computer program stored thereon and readable by a computer which is capable of communicating with an image processing apparatus capable of executing a plurality of processing operations on input data, the computer program, when executed by the computer to perform operations including: detecting a selecting operation of a plurality of processing operations from among the plurality of processing operations; storing a plurality of processing operation information for specifying the detected processing operations, respectively; and transmitting the stored plurality of processing operation information to the image processing apparatus.

BRIEF DESCRIPTION OF DRAWINGS

The above and other aspects of the present invention will become more apparent and more readily appreciated from the following description of exemplary embodiments of the present invention taken in conjunction with the attached drawings, in which:

FIG. 4 is a view showing a storage table of ROM in the multifunction apparatus;

FIG. 5 is a view showing a storage table of RAM in the multifunction apparatus;

FIG. 26 is a view showing a second display example of the liquid crystal displaying portion on which functions are registered in the function register box.

DETAILED DESCRIPTION

First Exemplary Embodiment

A first exemplary embodiment of the present invention will be explained with reference to the drawings. In the first exemplary embodiment, the inventive concept of the present invention is applied to a multifunction apparatus. Generally, the multifunction apparatus is equipped with a printer function, a scanner function, a copier function, and a facsimile function. However, it is not necessary to provide all these functions.

Figure 1:
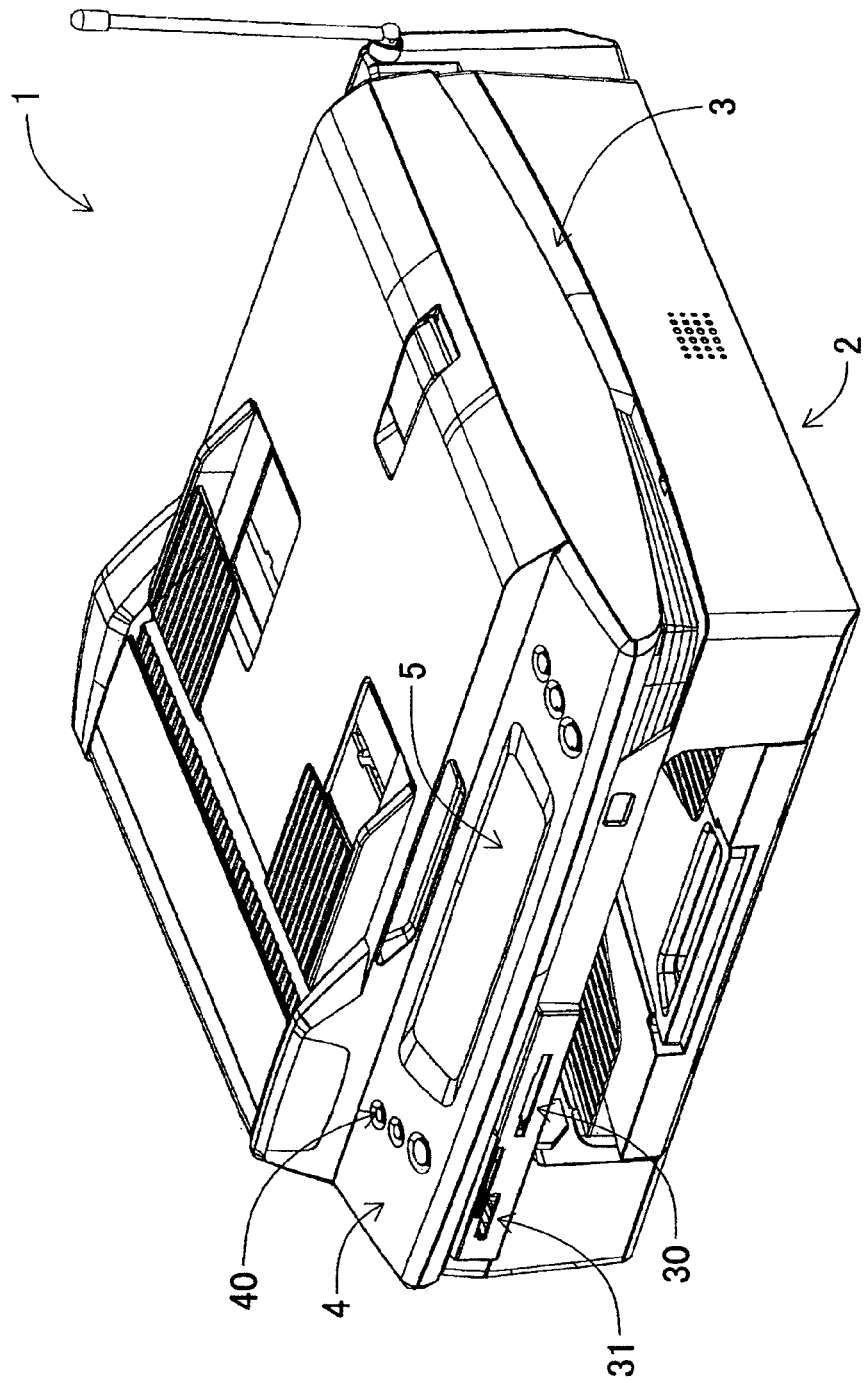
FIG. 1 is an overall perspective view of a multifunction apparatus according to a first exemplary embodiment of the present invention.

An overall external appearance of a multifunction apparatus 1 according to the first exemplary embodiment of the present invention will be explained with reference to FIG. 1 and FIG. 2. FIG. 1 shows an external appearance of the multifunction apparatus 1. In FIG. 1, the multifunction apparatus 1 includes a related-art printer portion 2 such as an ink jet printer, or the like at a lower portion of a frame, a related-art scanner portion 3 of flat bed type at an upper portion of the frame, and an operation panel portion 4 on a front upper surface of the frame. A touch panel 5 is arranged in a center of the operation panel portion 4.

Figure 2:
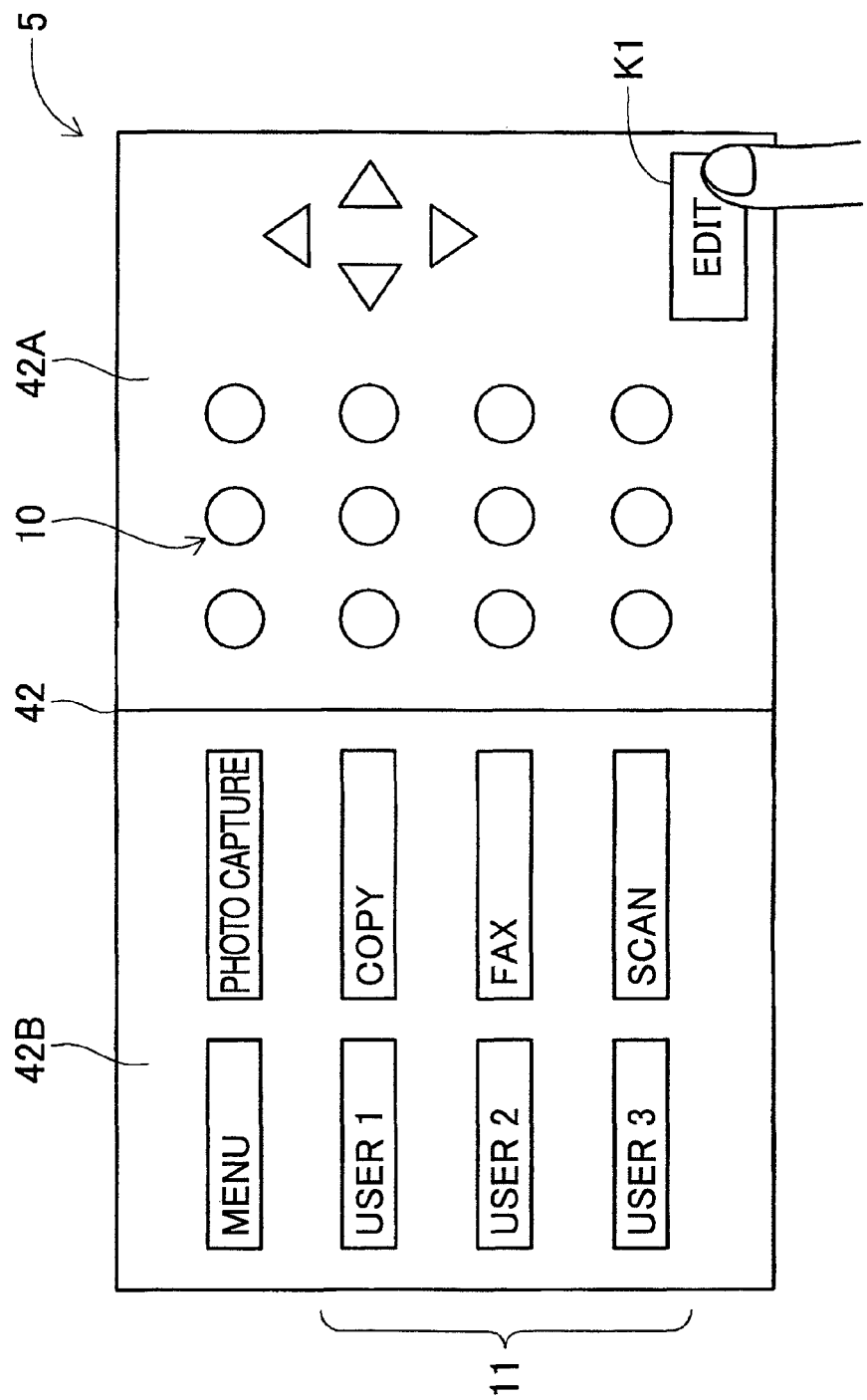
FIG. 2 is a view showing a display example of a liquid crystal displaying portion on which an initial screen is displayed.

As shown in FIG. 2, in order to select various functions of the multifunction apparatus 1, a "facsimile" key, a "scan" key, and a "copy" key can be displayed on the touch panel 5 as a part of a large number of input keys. Also, in order to input numerals, characters, and others, related-art input numeric keys 10 (see FIG. 2) can be displayed on the touch panel 5.

Also, user setting keys 11 can be displayed on the touch panel 5. In the first exemplary embodiment, two or more functions that are desired to be used can be registered for each user setting key 11.

Input keys 40 shown in FIG. 1 include a power key used to instruct a power ON of the multifunction apparatus 1, for example. The user can give various instructions to the multifunction apparatus 1 by operating respective input keys 40.

The multifunction apparatus 1 is configured to process information of an external memory as well as an internal memory. In the first exemplary embodiment, a Compact Flash (registered trademark) and an SD memory card (registered trademark) can be used as the external memory.

As shown in FIG. 1, the multifunction apparatus 1 includes slot portions 30, 31 just below the operation panel portion 4. The Compact Flash (registered trademark) is insertable to the slot portion 30. The SD memory card (registered trademark) is insertable to the slot portion 31.

Figure 3:
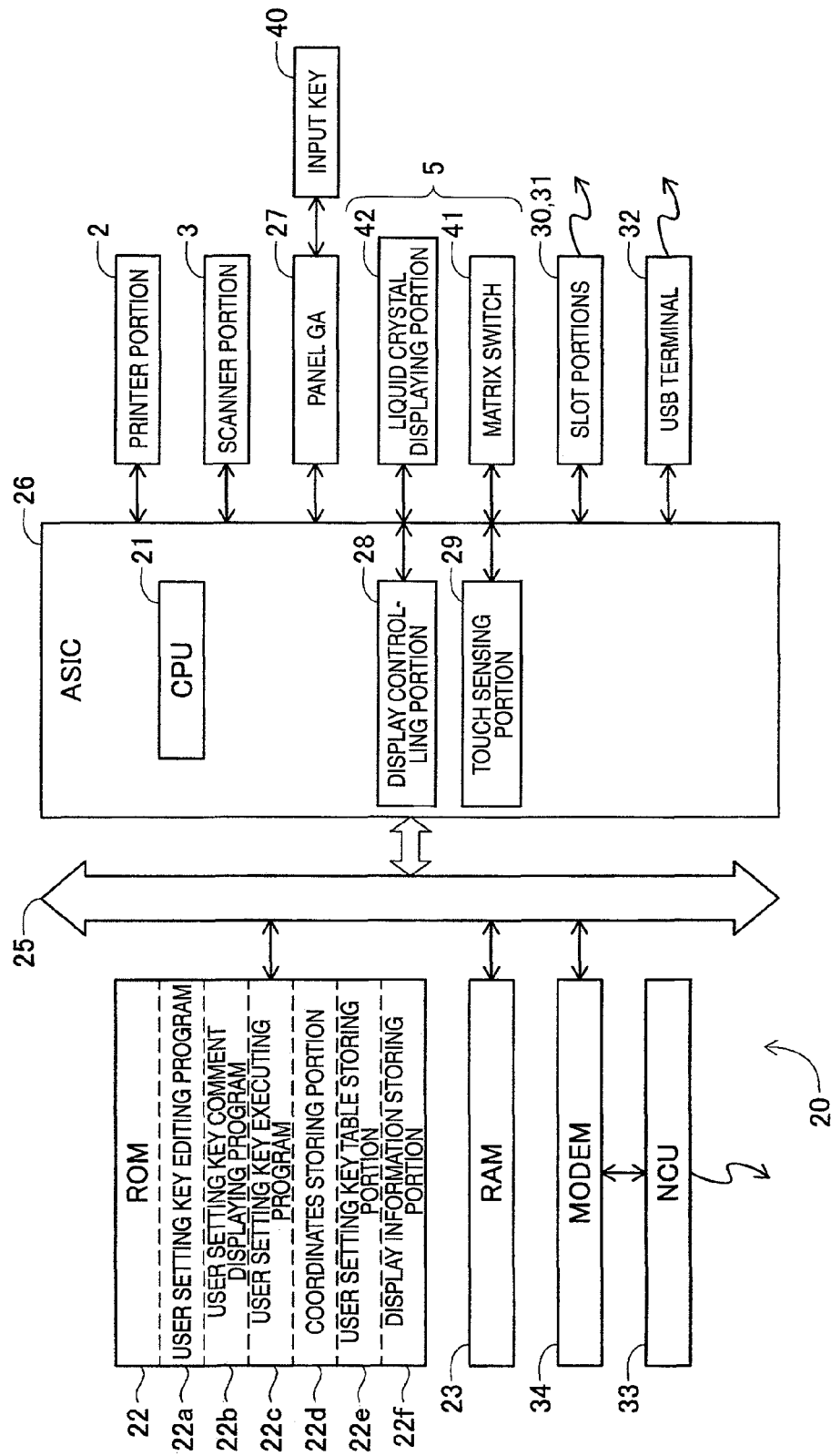
FIG. 3 is a block diagram showing an electrical configuration of the multifunction apparatus.

An overall electrical configuration of the multifunction apparatus 1 will be explained with reference to FIG. 3. FIG. 3 is a block diagram showing an electrical configuration of the multifunction apparatus 1. In FIG. 3, an Application Specific Integrated Circuit (ASIC) 26 performs the control processes generally in accordance with the instruction from a CPU 21 to execute various functions of the multifunction apparatus 1. The ASIC 26 is connected to a ROM 22, a RAM 23, and a MODEM 34 via an external bus 25. The printer portion 2 and the scanner portion 3 are connected to the ASIC 26. The input keys 40 are connected to the ASIC 26 via a panel gate array (panel GA) 27. The panel GA 27 controls input of signals to the ASIC 26 in response to operations to a number of input keys 40.

The touch panel 5 includes a matrix switch 41 composed of transparent electrodes, and a liquid crystal displaying portion 42 provided below his matrix switch 41. This configuration is known. The matrix switch 41 is connected to a touch sensing portion 29 provided in the ASIC 26. The liquid crystal displaying portion 42 is connected to a display controlling portion 28 provided in the ASIC 26. When the user touches a desired position on the matrix switch 41, the touch sensing portion 29 senses the touched coordinate position and outputs a position signal to the CPU 21.

In order to cause the liquid crystal displaying portion 42 to display various information about the functions that the multifunction apparatus 1 executes, the display controlling portion 28 controls a screen of the liquid crystal displaying portion 42 in accordance with the instruction from the CPU 21.

A Network Control Unit (NCU) 33 shown in FIG. 3 is connected to the MODEM 34 to control a facsimile communication. The MODEM 34 is connected to the ASIC 26 via the external bus 25.

Configurations of various storing portions that are provided to the multifunction apparatus 1 will be explained with reference to FIG. 3 to FIG. 5. The CPU 21 shown in FIG. 3 executes the control processes to execute various functions in accordance with the program stored in the ROM 22. In the first exemplary embodiment, the ROM 22 is configured by the flash memory. The ROM 22 has a program storing portion, a coordinates storing portion 22d, a user setting key table storing portion 22e, and a display information storing portion 22f.

The program storing portion stores a main program used to generally control the multifunction apparatus 1, and also stores various programs such as a user setting key editing program 22a, a user setting key comment displaying program 22b, a user setting key executing program 22c, and the like.

The user setting key editing program 22a executes process (see FIG. 6 and FIG. 7) when the user registers two or more desired functions on the user setting keys 11, as described later.

The user setting key comment displaying program 22b executes processes (see FIG. 8) when contents of the functions being registered on the user setting keys 11 are displayed in a first display area 42A, as described later.

The user setting key executing program 22c executes process (see FIG. 9) to execute the functions being registered on the user setting keys 11, as described later.

The coordinates storing portion 22d stores coordinate positions of the matrix switch 41, and the like. The coordinate positions of the matrix switch 41 correspond to display positions of information being displayed in respective display areas 42A, 42B.

The user setting key table storing portion 22e stores two or more functions registered on the user setting keys 11 to correlate with a sequence of execution of the functions, as illustrated in FIG. 4. FIG. 4 shows an example of the case where three functions are registered on the user setting key 11 (a "user 1" key in FIG. 2).

In FIG. 4, "usr1_tbl" to "usr3_tbl" denote a memory area name of respective user setting keys 11 (the "user 1" key to a "user 3" key). "usr1_func (1)" to "usr1_func (5)" denote the sequence of execution of the functions that are registered for respective user setting key 11.

In the illustrated example, by registered function information "scan_card", the process of transmitting image data being captured by executing the scanner function to the SD memory card (registered trademark), or the like is set as the process executed at first.

As the process executed subsequently to the process of transmitting the image data to the SD memory card (registered trademark), or the like, the process of transmitting the image data to the personal computer (PC) is set by registered function information "to_pc".

The process of printing the image data is set by registered function information "to_print" as the third process.

The display information storing portion 22f shown in FIG. 3 stores display information such as various images that are displayed on the liquid crystal displaying portion 42 when respective functions of the multifunction apparatus 1 are executed, and the like. The display information storing portion 22f stores the display information indicating various images, messages, and colors that are displayed on the liquid crystal displaying portion 42 respectively when the user setting key editing program 22a, the user setting key comment displaying program 22b, and the user setting key executing program 22c are executed.

The RAM 23 includes a working area in which the processed data are stored temporarily while the CPU 21 executes the programs in the program storing portion. In the first exemplary embodiment, as shown in FIG. 5, the RAM 23 stores temporarily two or more functions registered for the user setting keys 11.

FIG. 5 shows an example of the case where three functions are registered temporarily in the user setting keys 11. In FIG. 5, "usr_tbl_tmp" denotes a name of a temporarily storing area. Here, explanation of the contents having the same names as those shown in FIG. 4 will be omitted herein.

Next the process executed by the CPU 21 in the multifunction apparatus 1 will be explained with reference to FIG. 2, FIG. 4 to FIG. 20. In the multifunction apparatus, when a power is turned ON by operating the power key, the main program is read by the CPU 21. At this time, an initial screen shown in FIG. 2 is displayed on the liquid crystal displaying portion 42.

Figure 6:
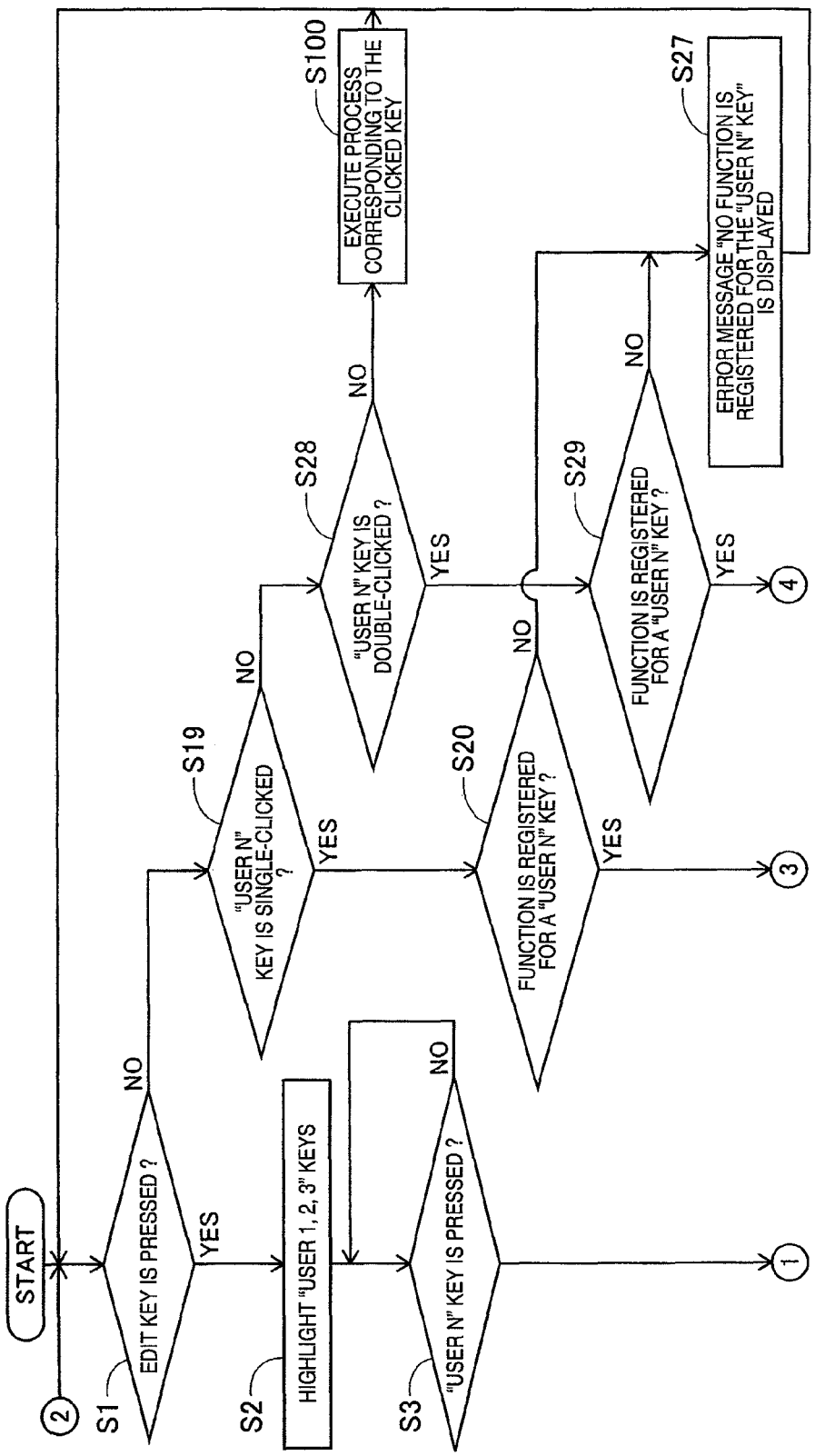
FIG. 6 is a first flowchart showing processes executed by the multifunction apparatus.
Figure 10:
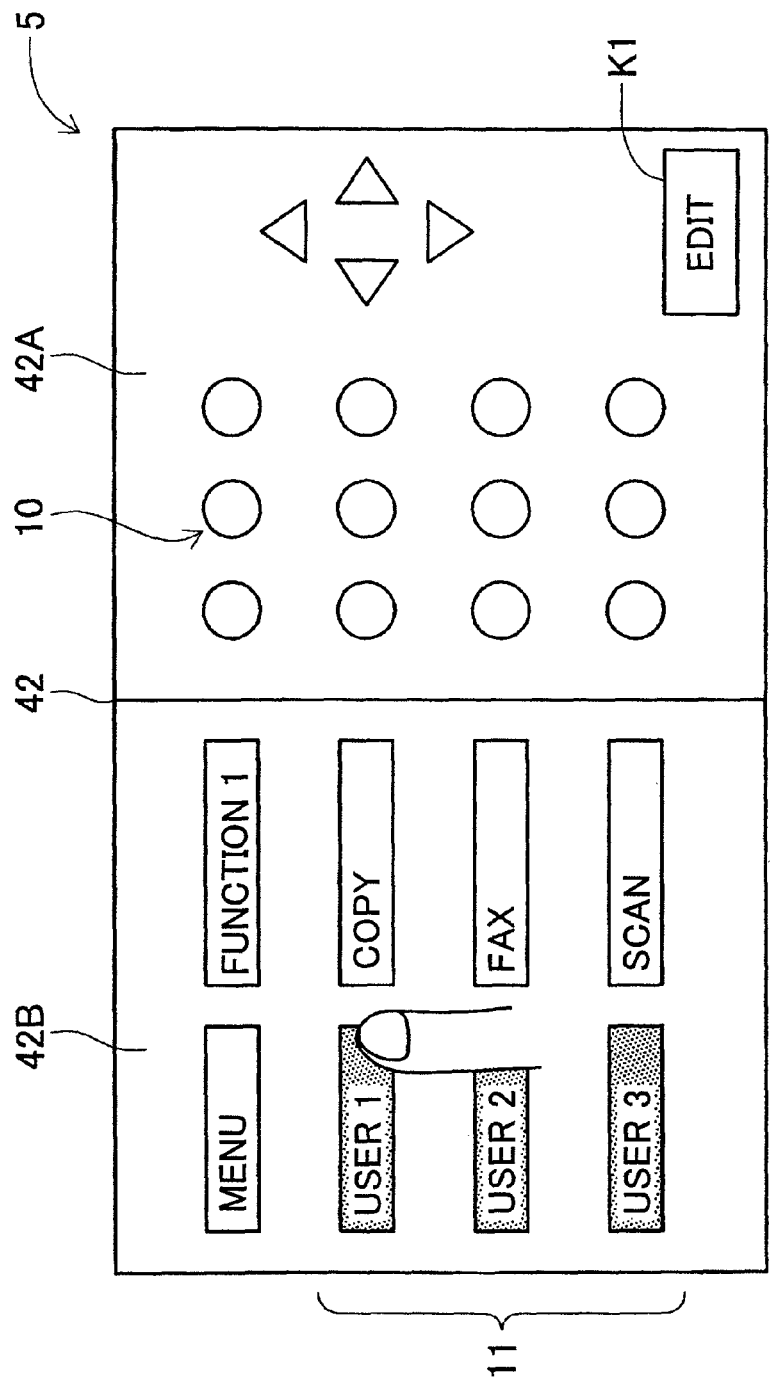
FIG. 10 is a view showing a display example of the liquid crystal displaying portion when user setting keys are highlighted.

Then, as shown in FIG. 6, it is determined by the CPU 21 whether an edit key K1 (see FIG. 2) arranged in the first display area 42A is pressed (S1). As shown in FIG. 2, if the edit key K1 is pressed by the user's finger (S1:YES), the user setting key editing program 22a is read out, and then the user setting keys 11 ("user 1, 2, 3" keys) are highlighted, as shown in FIG. 10 (S2). Based on such display in a highlighted manner, the user can know which key should be selected subsequently.

After the operation of S2, it is determined by the CPU 21 whether any one of the user setting keys 11 is pressed (S3). At S3, it is also determined which user key (a "user N" key) out of a "user 1" key, a "user 2" key and a "user 3" key is pressed.

Figure 7:
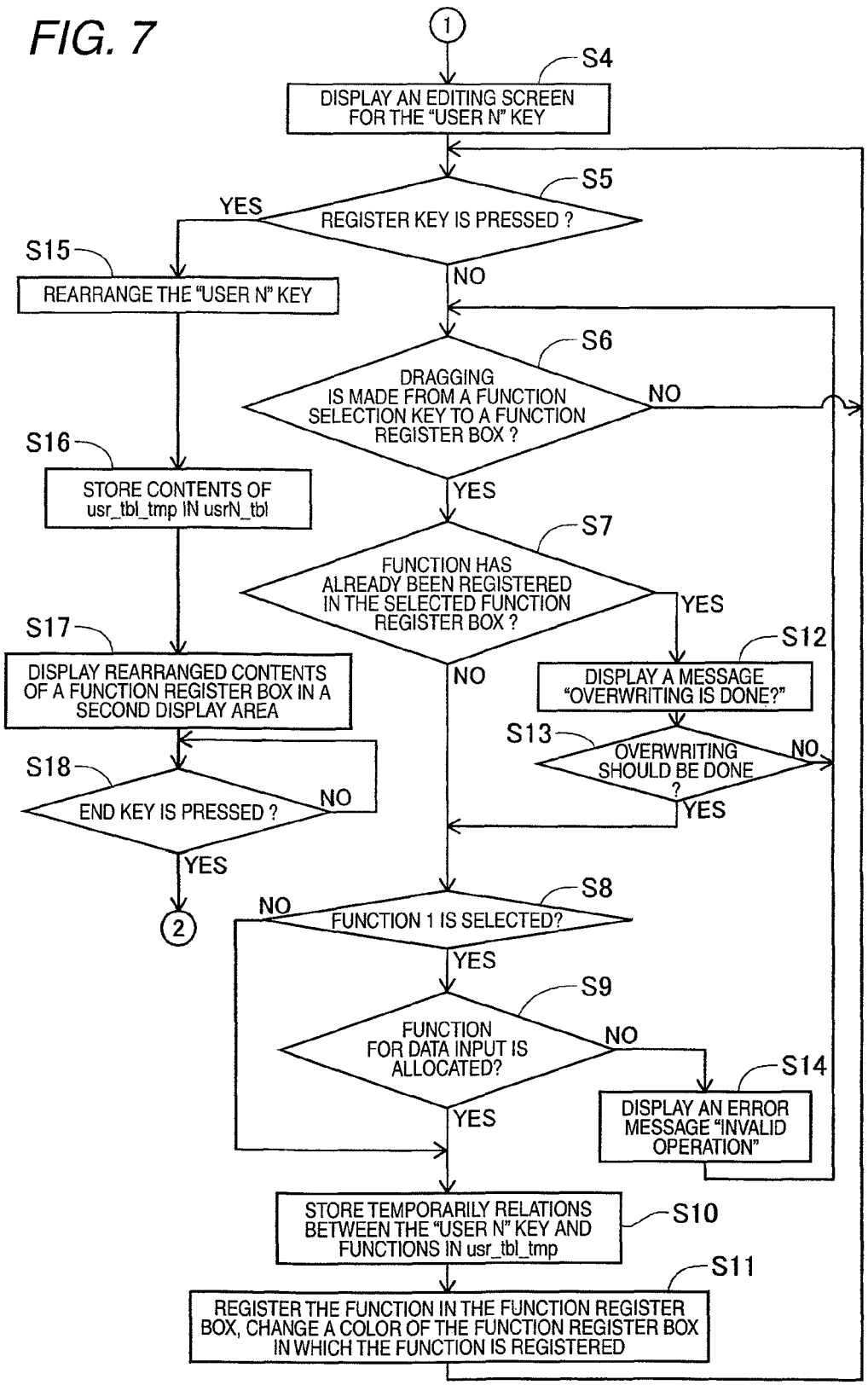
FIG. 7 is a second flowchart showing processes executed by the multifunction apparatus.
Figure 11:
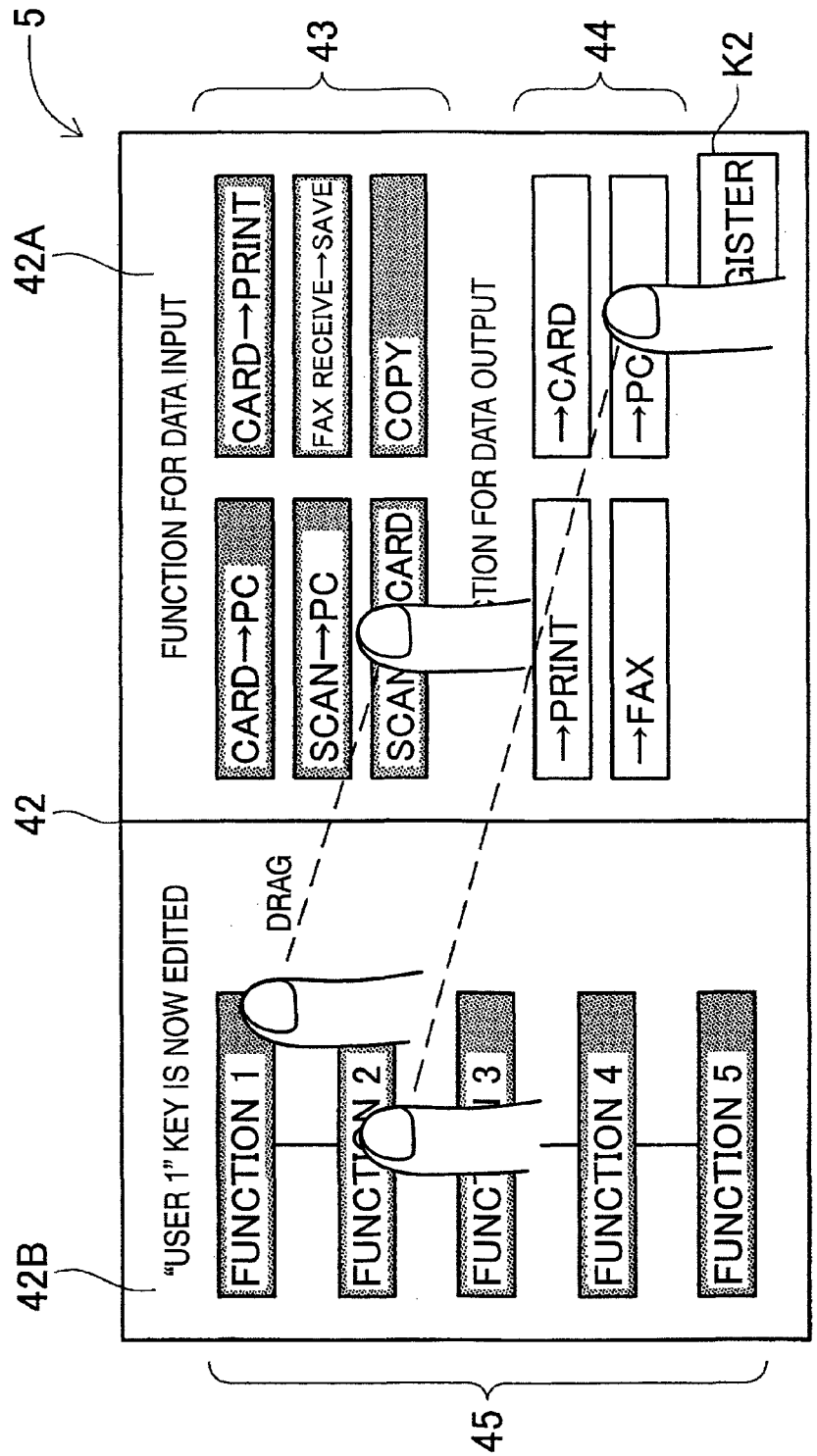
FIG. 11 is a view showing a display example of a user editing screen on the liquid crystal displaying portion.

As shown in FIG. 10 if the "user 1" key is pressed by the user's finger (S3:YES), an editing screen for the "user N" key (the "user 1" key, in this case) is displayed on the liquid crystal displaying portion 42, as shown in FIG. 7 and FIG. 11 (S4). In the user editing screen shown in FIG. 11, based on the display information stored in the display information storing portion 22f, a plurality of functions for data input, which he user can select are displayed in an upper-half display area 43 in the first display area 42A by the CPU 21 and the display controlling portion 28.

A function for data input means a function of accepting image data input to the multifunction apparatus 1 and applying a predetermined process to the image data. Here, function selection keys that are respectively labeled "CARD→PC", "CARD→print", "scan→PC", "FAX receive→save", "scan→CARD", and "COPY" are displayed on the display area 43.

A plurality of functions for data output, which the user can select are displayed in a lower-half display area 44 in the first display area 42A by the CPU 21 and the display controlling portion 28.

A function for data output means a function of applying a predetermined process to the image data having already stored in the multifunction apparatus 1. Here, function selection keys that are respectively labeled "→print", "→CARD", "→FAX", and "→PC" are displayed in the display area 44. A register key K2 as well as respective function selection keys is displayed in the display area 44. In this manner, when the area in which the functions for data input are displayed and the area in which the functions for data output are displayed are provided in the first display area, respective functions can be displayed such that the user can easily discriminate their display positions. As a result, mistakes in selecting the function for data input and the function for data output can be reduced or prevented.

At the top of the second display area 42B, the message "the user 1 key is now edited" is displayed by the CPU 21 and the display controlling portion 28. A function register box 45 is displayed in the second display area 42B to register the functions that are selected by the user.

In the first exemplary embodiment, in order to enable one user key to register five functions, the function register box 45 for a function 1 key to a function 5 key is provided. In the first exemplary embodiment, since the first display area and the second display area are displayed on the same screen in this manner, the user can select plural selectable functions displayed in the first display area while checking the functions displayed in the second display area. Therefore, operability and accuracy of the operation to select the desired function can be improved. Also, the arrangement of the function 1 key to the function 5 key displayed as the function register box 45 corresponds to the sequence of execution. That is, respective functions are carried out sequentially from the function registered as the function 1. In this way, since the display of a plurality of functions displayed in the second display area is arranged to correspond to the sequence of execution, the user can perform the editing work in combination of plural functions while checking the sequence of execution.

As shown in FIG. 7, after the operation of S4, it is determined by the CPU 21 whether the register key 12 is pressed by the user's finger (S5). If the register key K2 is not pressed by the user (S5: NO), it is determined whether a dragging is made from any function selection key out of ten function selection keys to the function register box 45 in the second display area 42B (S6). In the first exemplary embodiment, as the functions to be registered in the function register box 45 are selected freely from the first display area 42A and then are registered in the function register box 45 corresponding to the desired sequence of execution, the user can select the sequence of execution of the functions.

As illustrate in FIG. 11, if the dragging is made from the function selection key "scan→CARD" to the function register box "function 1" (S6: YES), it is determined by the CPU 21 whether the function has already been registered in the selected function register box 45 (here, "function 1") (S7). In other words, it is determined whether the register function information used to specify the function has already been stored in "user1_func(1)" shown in FIG. 5.

If it is determined that the function has not been registered in the selected function register box 45 (S7: NO), it is determined by the CPU 21 whether the function register box "function 1" is selected (S8). In other words, it is determined whether the function whose sequence of execution is earliest is selected. If the function register box "function 1" is selected (S8: YES), it is determined whether an allocation request of a function other than the functions for data input is made to the function register box "function 1" (S9).

As illustrated in FIG. 11, if the function for data input (here, "scan→CARD") is allocated to the function register box "function 1" (S9: YES), the function ("scan-to-card") is stored temporarily in the "function 1" whose sequence of execution is earliest (here, "usr1_func(1)") in the temporary storing area ("usr_tbl_tmp") of the RAM 23, as shown in FIG. 5 (S10).

At the operation of S8, if it is determined by the CPU 21 that the function register box "function 1" is not selected (S8: NO), the operation of S9 is not executed, and then the operation of S10 is executed. After the input of input data is completed by the inputting operation whose number of execution is earliest, a series of functions can be executed.

After the operation of S10, the function stored temporarily by the operation of S10 is displayed in the function register box 45 (here, "function 1") (S11). Further, at the operation of S11, the display of a color of the function register box 45 in which the function is registered is changed. After the operation of S11, the process returns to the operation of S5.

Figure 12:
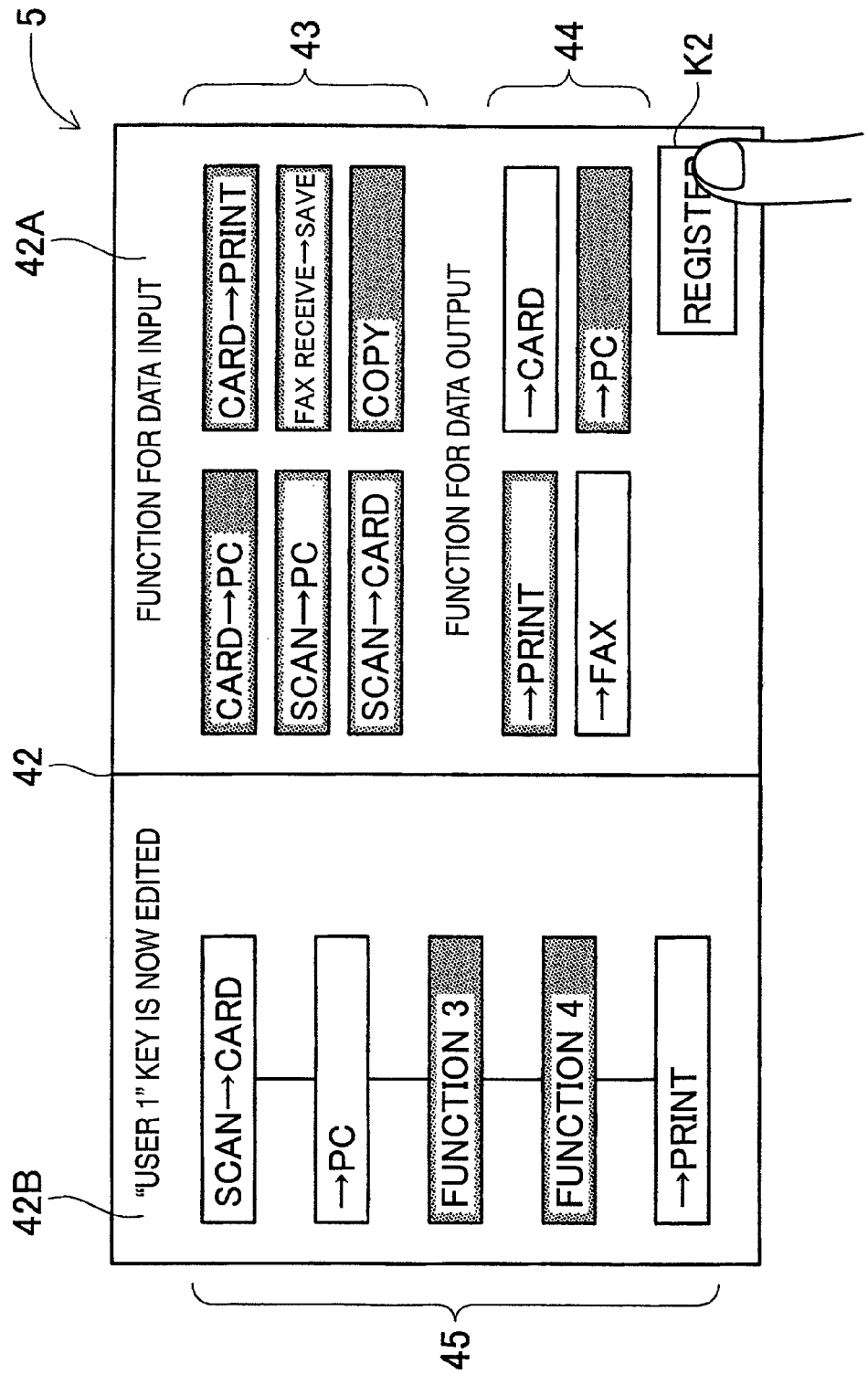
FIG. 12 is a view showing a first display example of the liquid crystal displaying portion on which functions are registered in a function register box.

In this manner, as shown in FIG. 5, the functions are stored in the temporary storing area "usr_tbl_tmp") of the RAM 23 by detecting the user's dragging operation repeatedly. As illustrated in FIG. 12, the function "scan→CARD", the function "→PC", and the function "→print" are displayed in the function register box "function 1", the function register box "function 2", and the function register box "function 5" by the operation of S11, respectively. Also, display colors of respective function register boxes "function 1", "function 2", and "function 5" are made different from the function register boxes "function 3" and "function 4" by the operation of S11.

At the above operation of S7, if it is determined that the functions have already been registered in the selected function register box 45 (S7: YES), for example, a message "overwriting is done?" is displayed in the second display area 42B by the CPU 21 and the display controlling portion 28 (S12).

After the operation of S12, it is determined by the CPU 21 whether the function different from the function being already registered should be overwritten in the function register box 45 in which the function has already been registered (S13). For example, an overwrite check key is displayed in the second display area 42B, and then it is determined whether the overwrite check key is pressed by the user.

If it is determined that the function different from the function being already registered should be overwritten in the function register box 45 in which the function has already been registered (S13: YES), respective operations subsequent to above S8 are executed.

If it is determined that the function different from the function being already registered should not be overwritten in the function register box 45 in which the function has already been registered (S13: NO), the process returns to the operation of S6. Therefore, even if a new dragging is made from the function selection key to the function register box 45, the relationship between the "user 1" key and the functions is not newly stored in the temporary storing area ("usr_tbl_tmp") of the RAM 23 unless the overwrite check key is pressed by the user. Accordingly, at the operation of S16 described later, unless the overwrite check key is pressed, the overwritten contents of the function different from the function being already registered are not stored in the storing area ("user N_tbl") of the user setting key table storing portion 22e. As a result, even though the sequence of execution is selected in error by the user, the functions that are correlated with the user's desired sequence of execution can be registered without fail by using the display of the message "overwriting is done?".

At the operation of S9, if it is determined that the function for data input is not allocated to the function register box "function 1" (S9: NO), for example, a message informing an error contents is displayed in the second display area 42B by the CPU 21 and the display controlling portion 28 (S14).

Here, for example, an error message "Invalid operation" is displayed in the second display area 42B. After the operation of S14, the process returns to the operation of S6. As a result, when the error message "Invalid operation" is displayed in the second display area 42B, as described above, the invalid functions that are not suitable for the function 1 are not stored in the storing area (usrN_tbl) of the user setting key table storing portion 22e, at the operation of S16 described later.

At the above operation of S3, if it is determined by the CPU 21 that any one of the "user 1" key, the "user 2" key, and the "user 3" key is not pressed (S3: NO), the operation of S3 is executed repeatedly. Also, in the above process of S6, if it is determined by the CPU 21 that the dragging is not made from the function selection key to the function register box 45 (S6: NO), operations of S5 and S6 are executed repeatedly.

In contrast, at the above operation of S5, as shown in FIG. 12, if it is determined that the register key K2 is pressed by the user's finger (S5: YES), a rearrangement in the "user N" keys is done by the CPU 21 and the display controlling portion 28 (S15). Here, the sequence of execution "usr1_func(1)" to "usr1_func(3)") of the "user 1" key in the RAM 23 shown in FIG. 5 are rearranged by the CPU 21 such that the execution operations are executed continuously as shown in FIG. 4. As a result, when the functions are to be executed by using the user keys, a plurality of functions can be executed continuously without interruption of operation, based on a plurality of register function information stored in the user setting key table storing portion 22e (usrN_tbl).

In this event, the operations of S8, S9, and S14 may be added after S15 such that the function for data output is not registered in the "function 1" due to such rearrangement.

After the operation at S15, contents of the temporary storing area ("usr_tbl_tmp") of the RAM 23 are stored in the storing area (usrN_tbl) of the user setting key table storing portion 22e (S16). Here, as shown in FIG. 4, respective registered function information "scan_card", "to_pc", "to_print" are stored in the storing area (usr1_tbl) of the "user 1" key by the CPU 21 to correspond to the sequence of execution in the "user 1" key.

Figure 13:
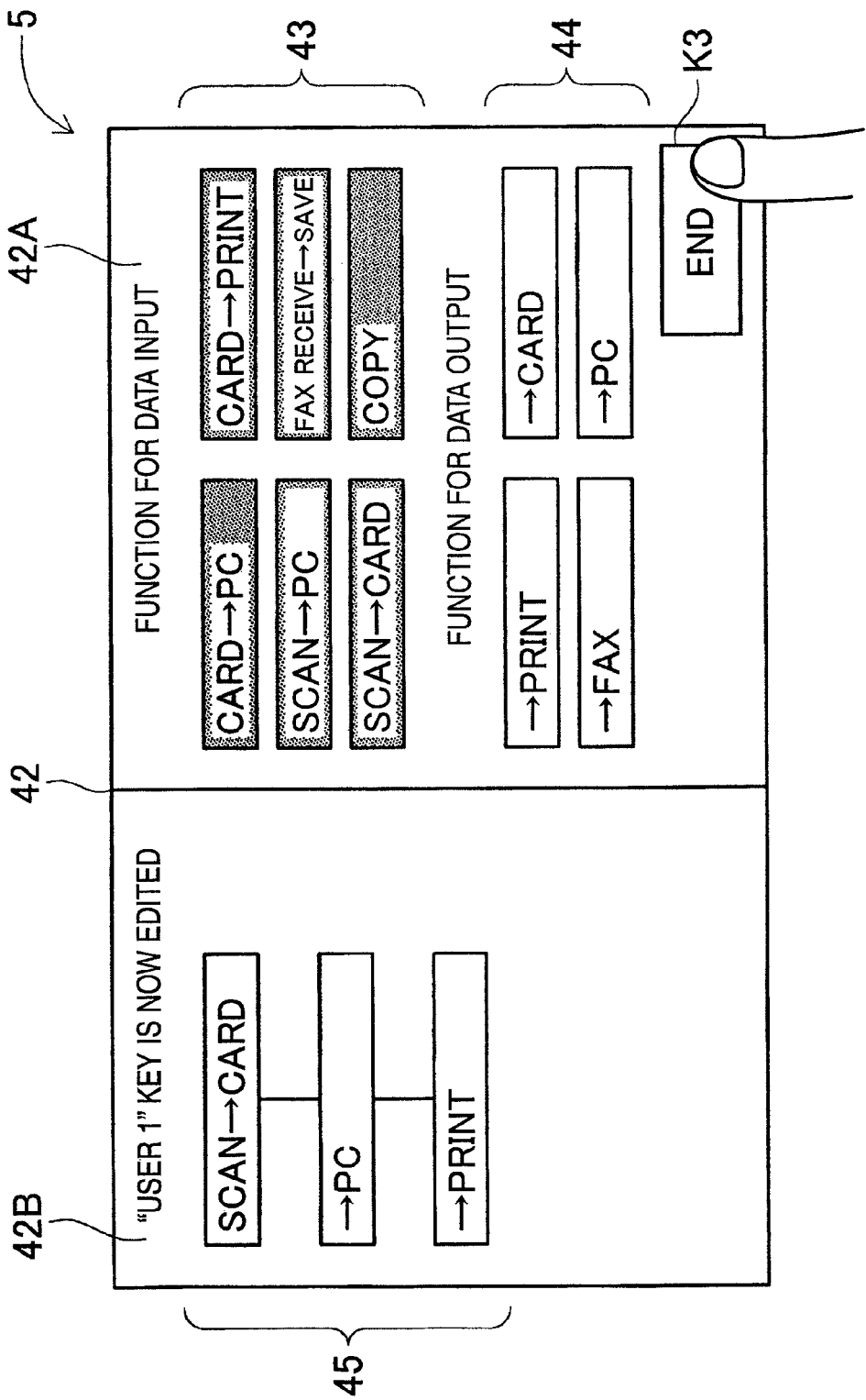
FIG. 13 is a view showing a display example of the liquid crystal displaying portion indicating a state that the function register box is rearranged.

After the operation of S16, rearranged contents of the function register box 45 are displayed in the second display area 42B (S17). Here, as shown in FIG. 13, three function register box 45 indicating the contents of the registered functions are displayed on the second display area 42B by the CPU 21 and the display controlling portion 28, according to the sequence of execution in the "user 1" key stored in the above storing area (usr1_tbl). At this time, as shown in FIG. 13, an end key K3 is displayed in the first display area 42A.

After the operation of S17, it is determined by the CPU 21 whether the end key K3 is pressed by the user's finger (S18). As shown in FIG. 13, if the end key K3 is pressed (S18: YES), the process returns to the operation of S1. In this manner, in the first exemplary embodiment, the user's desired combination of functions can be registered freely as the user keys, by detecting the user's selecting operation of any functions.

At the operation of S18, if it is determined by the CPU 21 that the end key K3 is not pressed (S18: NO), the operation of S18 is executed repeatedly.

Next, the process of checking the functions that are registered to the user keys, in accordance with the user setting key comment displaying program 22b will be explained. In the process in FIG. 6, if it is determined by the CPU 21 that the edit key K1 (see FIG. 2) is not pressed (S1: NO), it is determined whether the "user N" key is single-clicked (S19). That is, it is determined whether any one key out of the "user 1" key to the "user 3" key is pressed.

Figure 14:
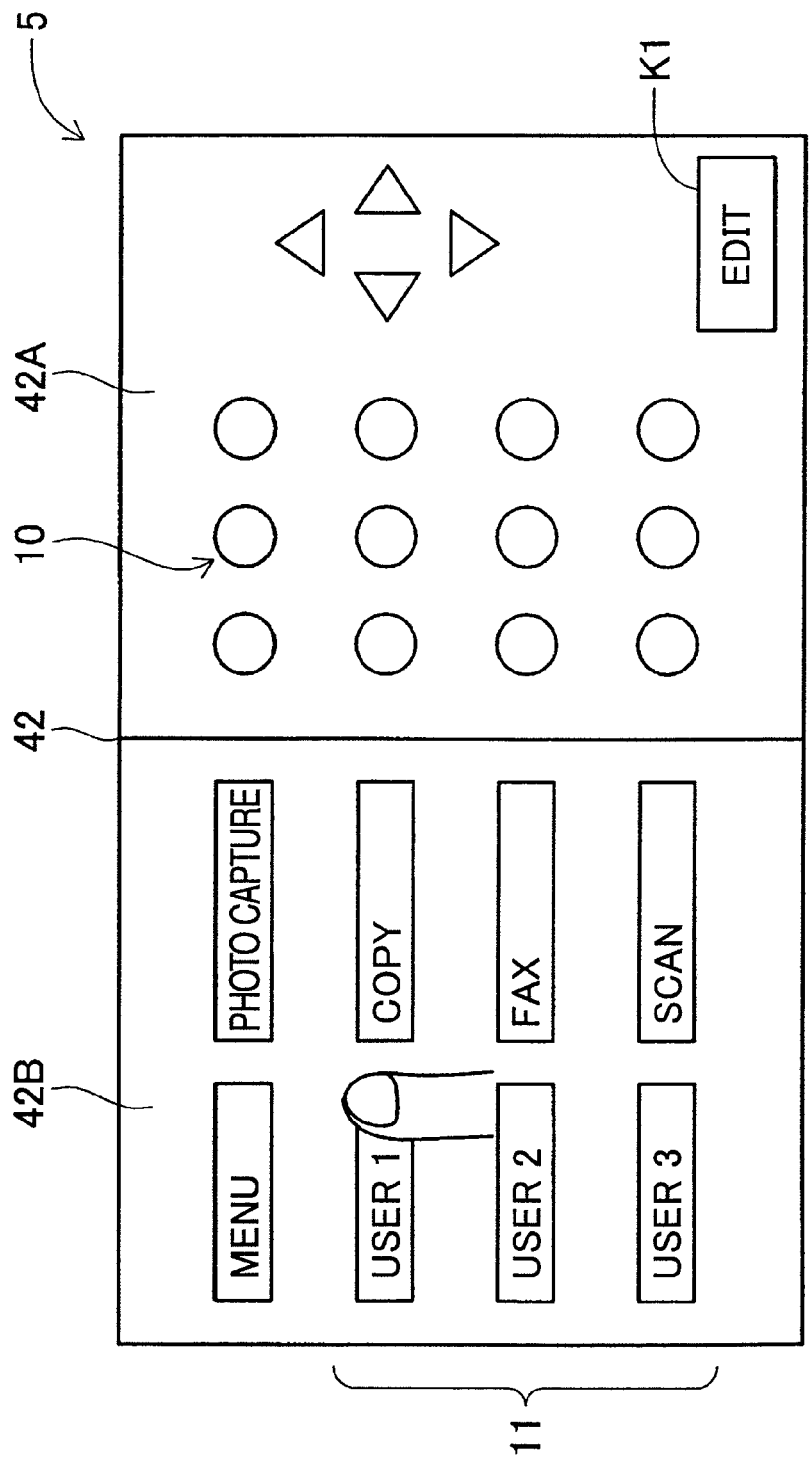
FIG. 14 is a view showing a display example of the liquid crystal displaying portion indicating a state that a "user 1" key is single-clicked.

As shown in FIG. 14, if the "user 1" key is single-clicked (S19: YES), the user setting key comment displaying program 22b is started by the CPU 21 and it is determined whether functions are registered for the "user N" key (S20). Here, it is determined by the CPU 21 whether the functions are registered for the "user 1" key.

Figure 8:
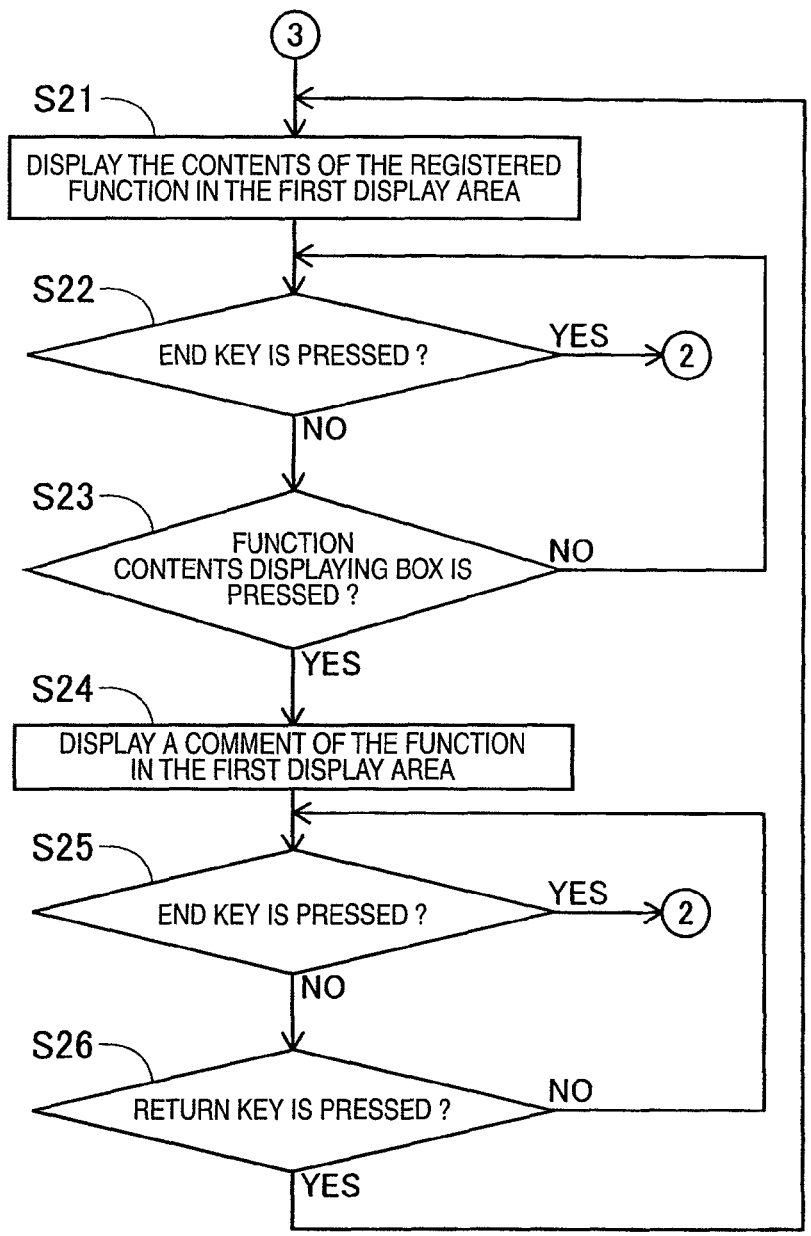
FIG. 8 is a third flowchart showing processes executed by the multifunction apparatus.
Figure 15:
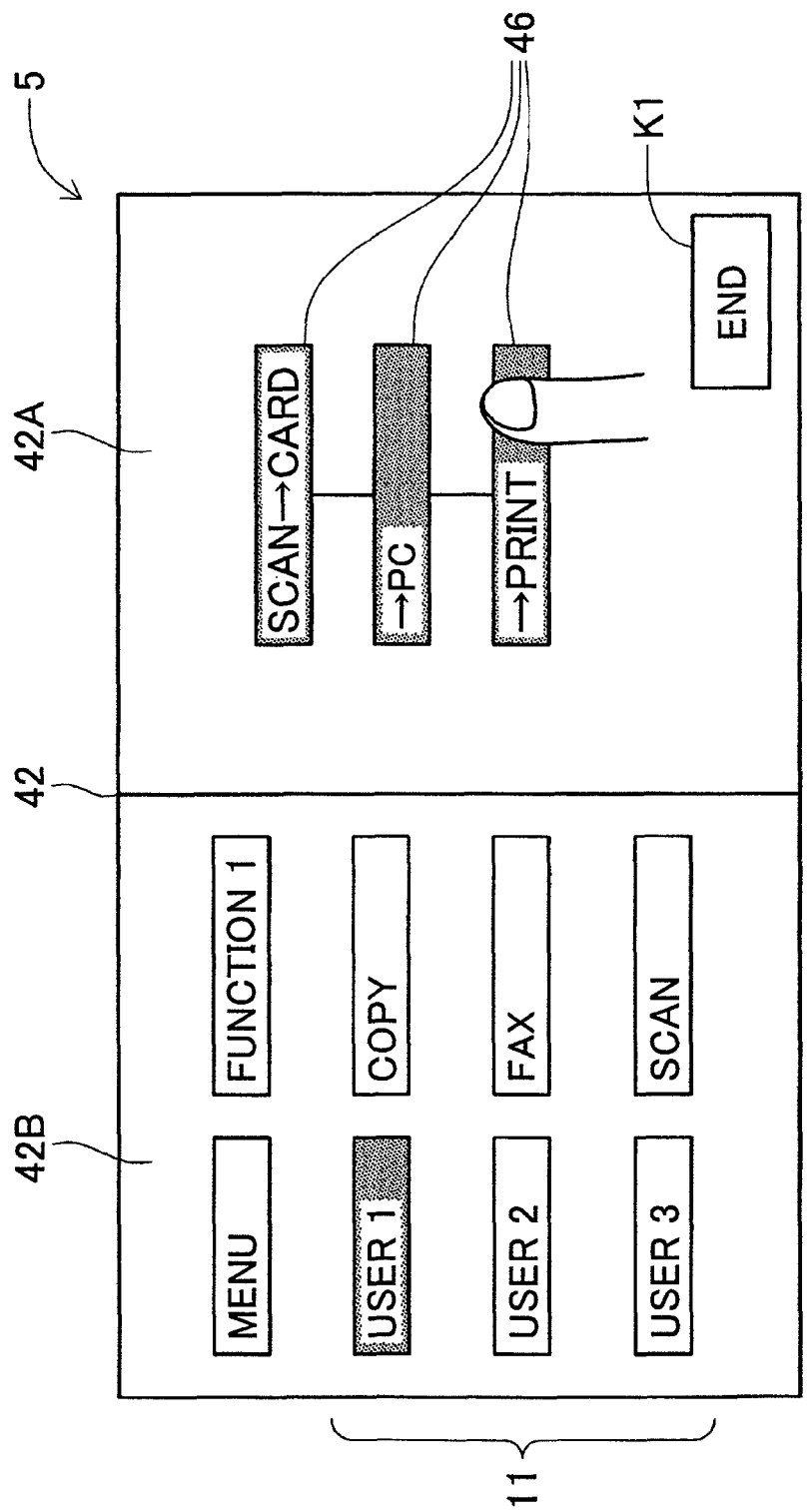
FIG. 15 is a view showing a display example of the liquid crystal displaying portion indicating a state that registered contents display boxes are displayed in a first display area.

If it is determined that the function is registered for the "user N" key (S20: YES), the contents of the registered function for the "user N" keys are displayed in the fit display area 42A by the CPU 21 and the display controlling portion 28, based on the register function information stored in "usr1_tbl" (see FIG. 4), as shown in FIG. 8 (S21). Here, as shown in FIG. 15, function contents display boxes 46 are displayed in the first display area 42A. The contents of respective functions ("scan→CARD", "→PC", and "→print") registered for the "user 1" key are displayed in the registered contents display boxes 46. At this time, an end key K4 is displayed in the first display area 42A, and the "user 1" key is displayed in a highlighted mode in the second display area 42B. In this manner, since the "user 1" key is highlighted, it can be checked which user key the registered function information displayed in the first display area is registered for.

After the operation of S21, it is determined by the CPU 21 whether the end key K4 is pressed by the user's finger (S22). If it is determined by the CPU 21 that the end key K4 is not pressed (S22: NO), it is determined by the CPU 21 whether any function contents displaying box out of three function contents display boxes 46 is pressed (S23).

Figure 16:
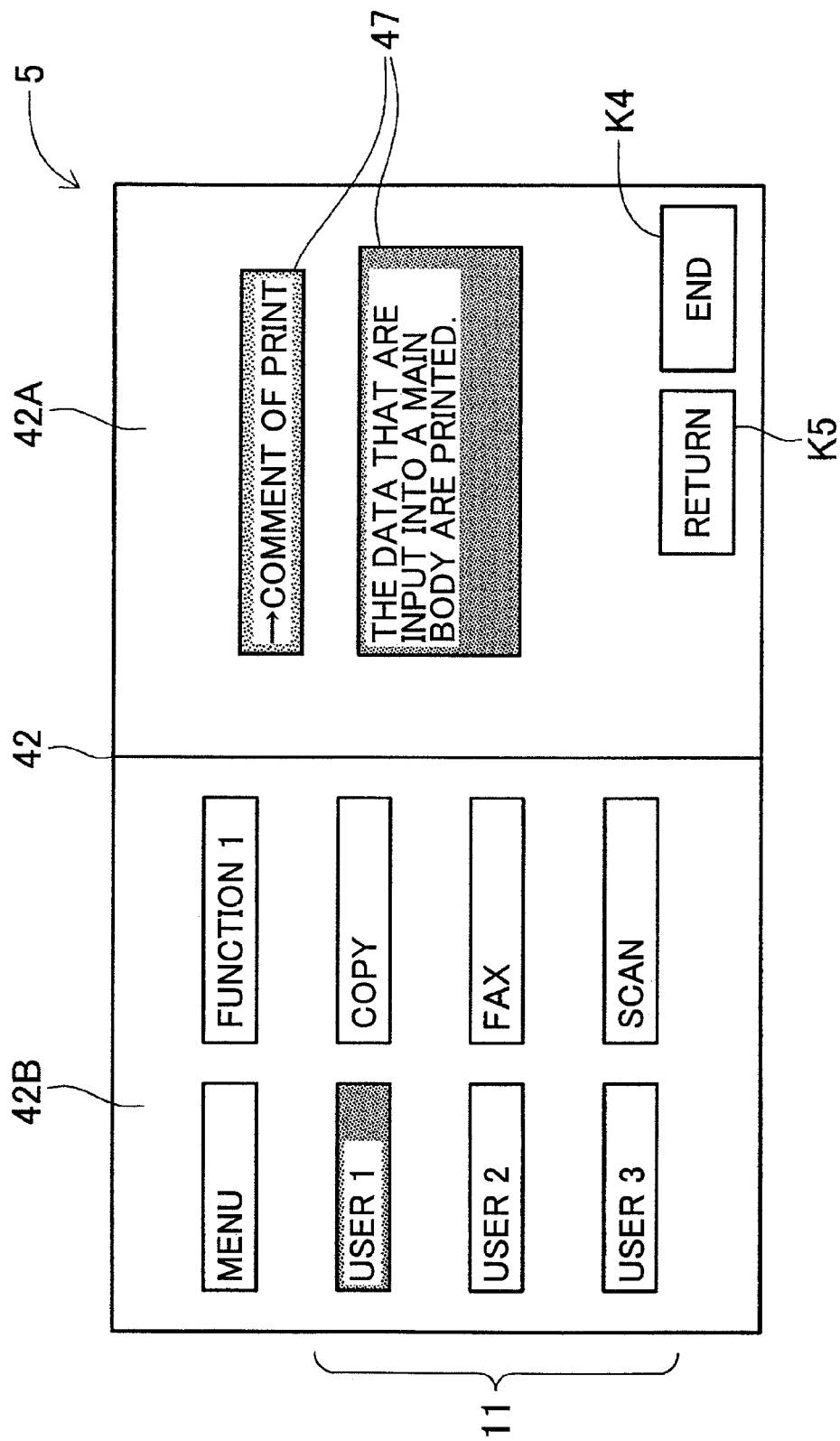
FIG. 16 is a view showing a display example of the liquid crystal displaying portion indicating a state that function comment display boxes are displayed in the first display area.

As illustrated in FIG. 15, if the function contents display box 46 indicating the function "→print" is pressed (S23: YES), function comment display boxes 47 are displayed in the first display area 42A, as shown in FIG. 16 (S24). The comment of the function that is selected at the operation of S23 and has been registered in the function contents display boxes 46 is displayed in the function comment display boxes 47.

At the operation of S24, as illustrated in FIG. 16, as the comment of function "→print", the message "The data that are input into the main body are printed." is displayed in the function comment display box 47. At this time, a return key K5 in addition to the end key K4 is displayed in the first display area 42A.

After the operation of S24, it is determined by the CPU 21 whether the end key K4 is pressed by the user (S25). If it is determined that the end key K4 is not pressed (S25: NO), it is determined by the CPU 21 whether the return key K5 is pressed (S26). If the return key K5 is pressed (S26: YES), the process returns to the operation of S21.

At the operation of S20 in FIG. 6, if it is determined by the CPU 21 that any function is not registered for the "user N" key (S20: NO), an error message is displayed in the liquid crystal displaying portion 42 by the CPU 21 and the display controlling portion 28 (S27). Here, for example, the message "The function is not registered for the "user N" key" is displayed in the first display area 42A as the error message. After the operation of S27, the process returns to the operation of S1.

At the operations of S22 and S25 in FIG. 8, it is determined by the CPU 21 that the end key K4 is pressed (S22: YES, S25: YES), the process returns to the operation of S1.

At the operation of S23, it is determined by the CPU 21 that no function contents display box 46 is pressed (S23: NO), the process returns to the operation of S22.

Next, the process of executing the function registered for a user key, in accordance with the user setting key executing program 22c will be explained. At the operation of S19 in FIG. 6, if it is determined that the "user N" key is not single-clicked (S19: NO), it is determined by the CPU 21 whether the "user N" key is double-clicked (S28). Here, it is determined whether any "user N" key out of the "user 1" key to the "user 3" key is double-clicked. That is, it is determined whether any "user 1" key to the "user 3" key is pressed twice in a predetermined time period. If it is determined that the "user N" key is not double-clicked (S28: NO), the process corresponding to the key that is clicked is done (S100). Then, the process returns to the operation in S1.

Figure 17:
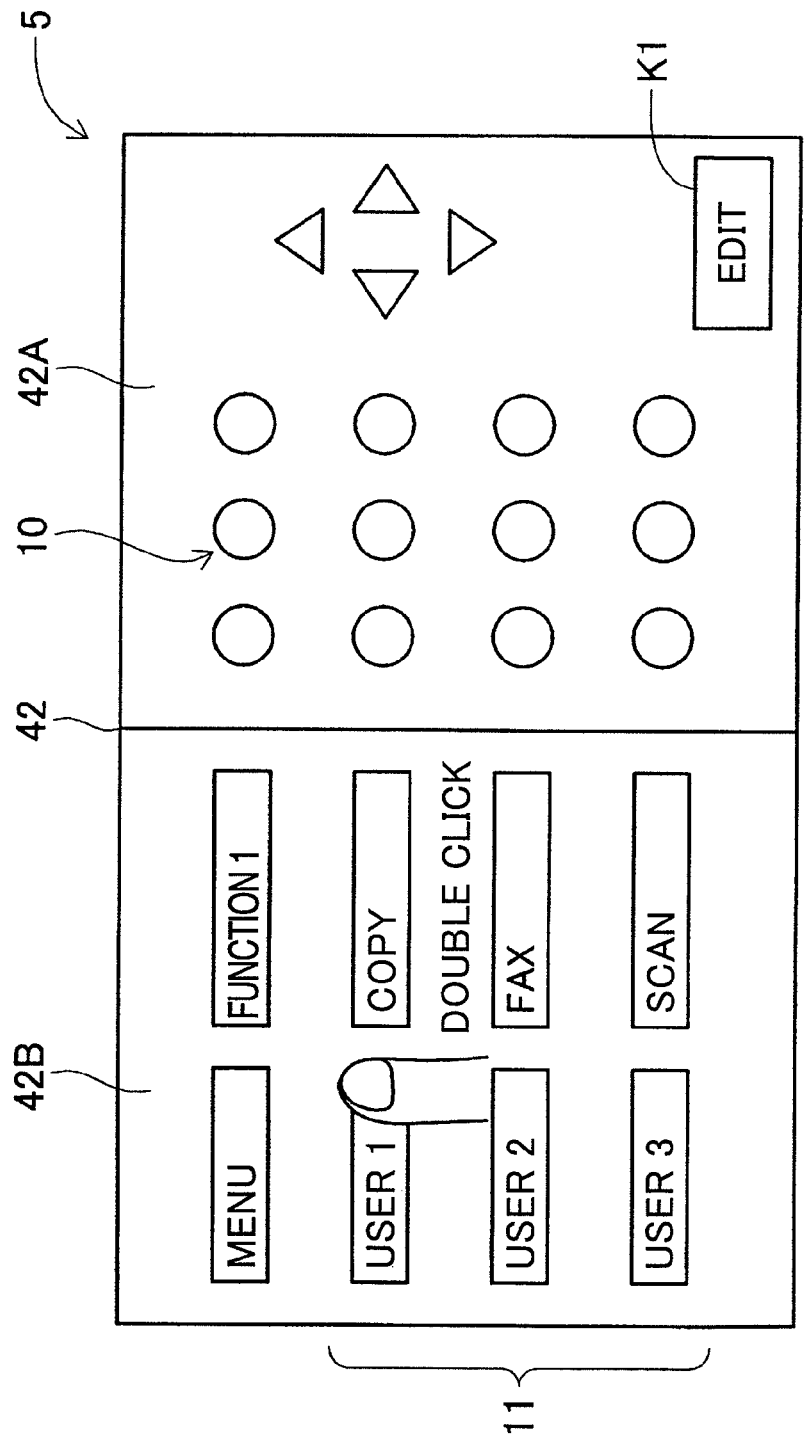
FIG. 17 is a view showing a display example of the liquid crystal displaying portion indicating a state that the "user 1" key is double-clicked.

As shown in FIG. 17, if the "user 1" key is double-clicked (S28: YES), the user setting key executing program 22c is, stated by the CPU 21, and then it is determined whether any function is registered for the "user N" key (S29). Here, it is determined by the CPU 21 whether any function is registered for the "user 1" key.

Figure 9:
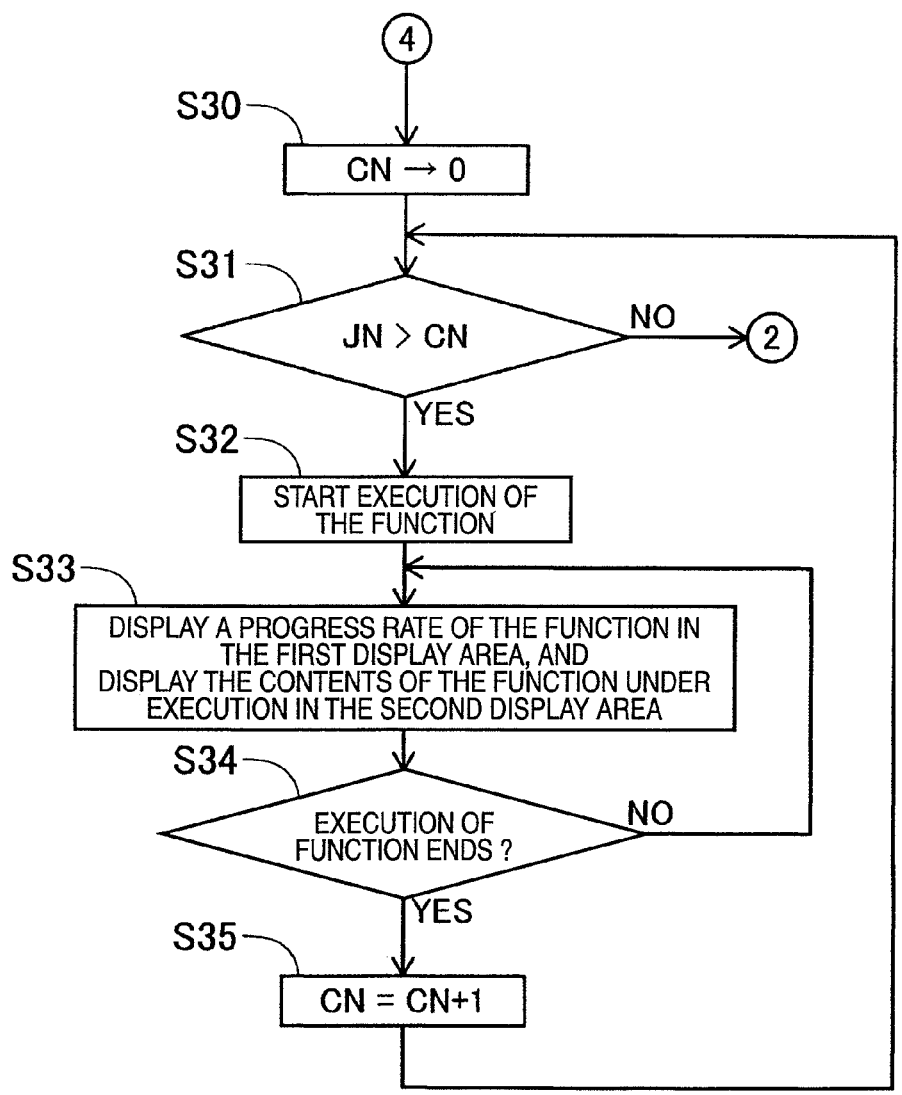
FIG. 9 is a fourth flowchart showing processes executed by the multifunction apparatus.

If it is determined that a function is registered for the "user N" key (S29: YES), the CPU 21 resets the number of processes that are executed by functions that have been registered for the "user N" key, as shown in FIG. 9 (S30). After the operation of S30, the number of functions JN that have been registered for the "user N" key are compared with the number of processes CN by the CPU 21 (S31). In contrast, if it is determined that the function is not registered for the "user N" key (S29: NO), the operation of S27 is executed.

If it is determined that the number of functions JN is larger than the number of processes CN (S31: YES), the execution of plural functions ("scan→CARD", "→PC", and "→print") registered for the "user N" key are started by the CPU 21 (S32). After the operation of S32, the CPU 21 and the display controlling portion 28 display a progress rate of the function that is being processed, in the first display area 42A, and display the contents of the function under execution, in the second display area 42B (S33).

Figure 18:
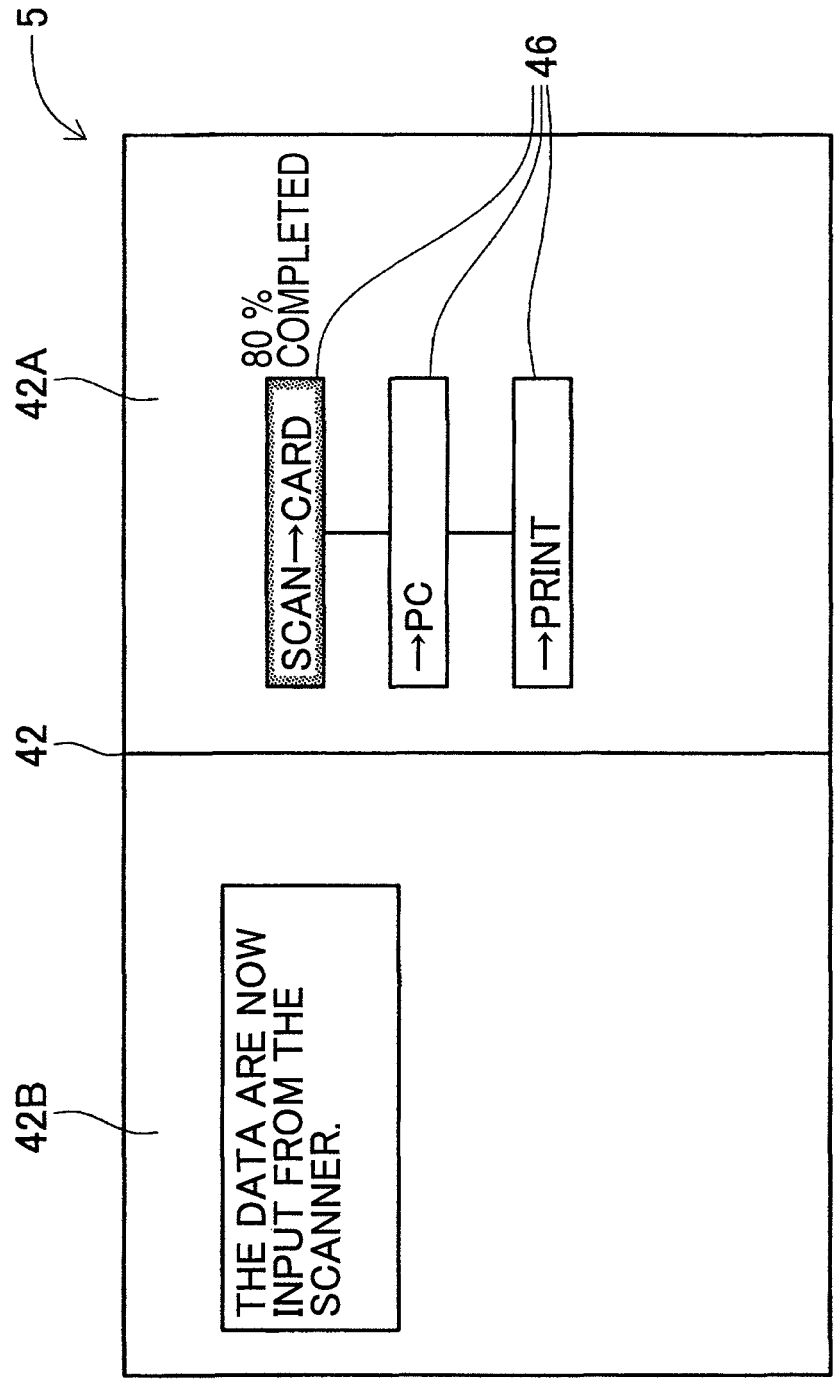
FIG. 18 is a view showing a first display example of the liquid crystal displaying portion indicating a state that a progress rate of a function under execution is displayed in the first display area.

As shown in FIG. 18, as the display of the contents of the function under execution, the message "The data are now input from the scanner." is displayed in the second display area 42B. As the display of the progress rate of the function under execution, the message "80% completed" is displayed in the right side of the function contents display box 46 indicating the function "scan→CARD" in the first display area 42A. At this time, the function contents display box 46 indicating the function "scan→CARD" is displayed in a highlighted mode.

After the operation of S33, it is determined by the CPU 21 whether the operation of the function being executed ends (S34). If the operation of the function ends (S34: YES), the number of processes CN is incremented by 1 (S35).

Figure 19:
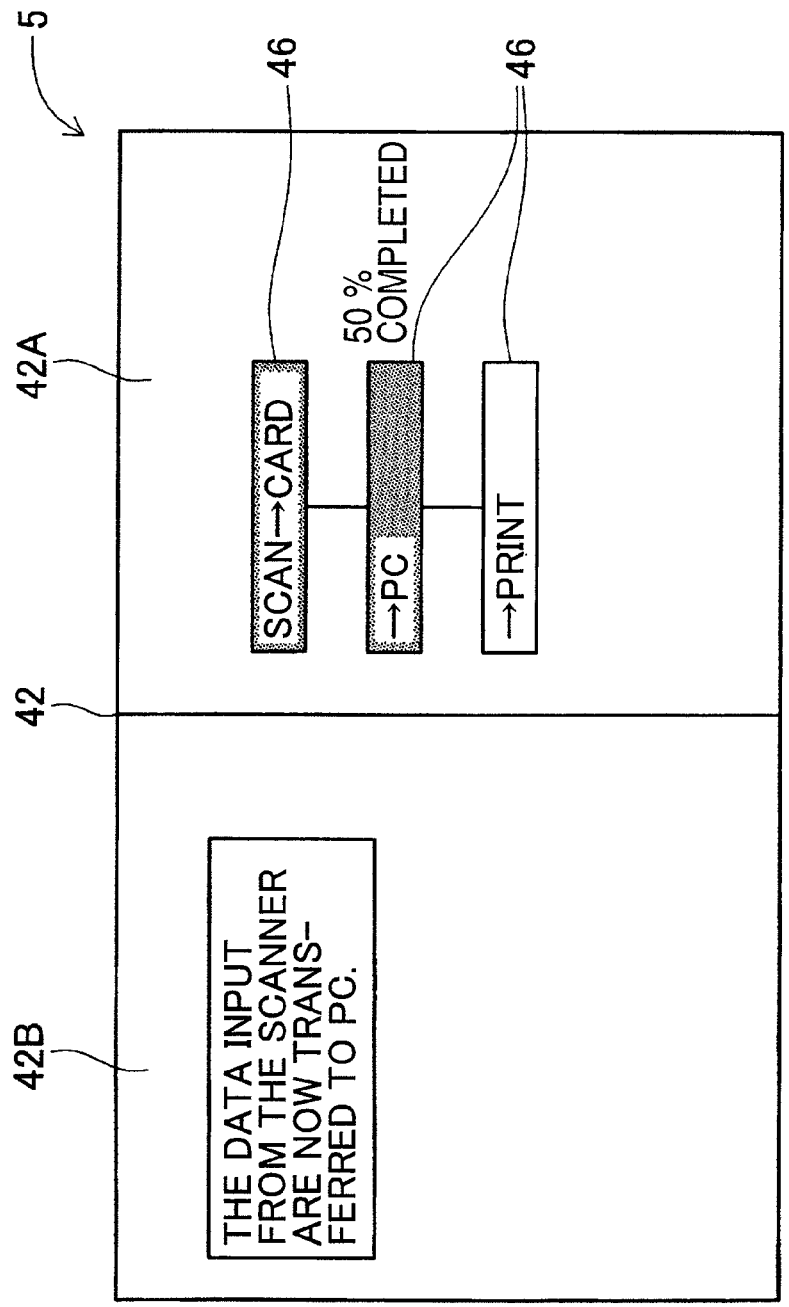
FIG. 19 is a view showing a second display example of the liquid crystal displaying portion indicating the similar state to that of FIG. 18.

After the operation of S35, the process returns to the operation of S31. If the operation of S33 is executed again by the CPU 21 and the display controlling potion 28, the message "The data input from the scanner are now transferred to PC." is displayed in the second display area 42B as the display of the contents of the function that is now executed, as shown in FIG. 19. As the display of the progress rate of the function being executed, the message "50% completed" is displayed in the right side of the function contents display box 46 indicating the function "→PC" in the first display area 42A. At this time, the function contents display boxes 46 indicating the function "scan→CARD" and the function "→PC" are displayed in a highlighted mode.

Then, at the operation of S31, if all functions registered for the "user N" key are executed, and then it is determined that the number of processes CN is larger than the number of functions JN (S31: NO), the process returns to the operation of S1.

Figure 20:
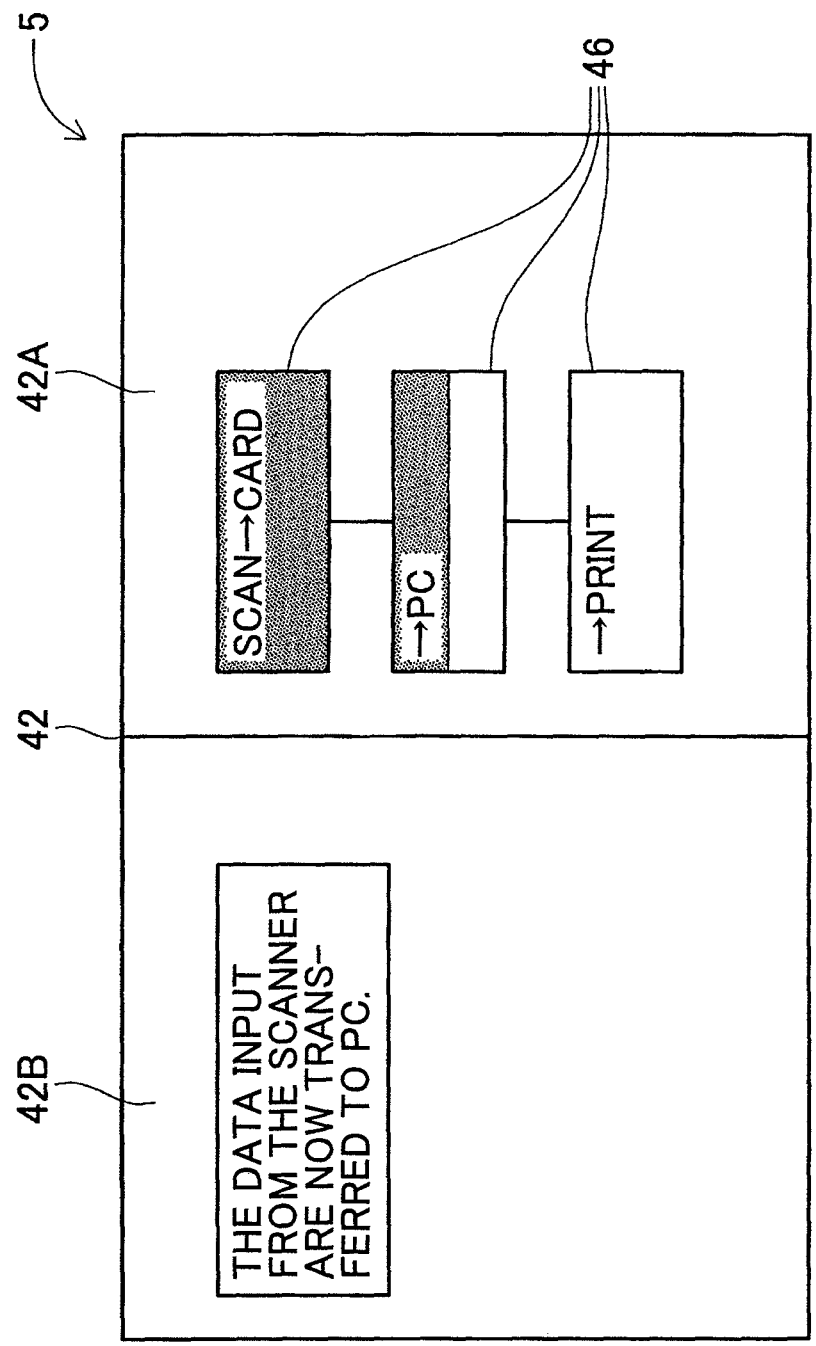
FIG. 20 is a view showing a third display example of the liquid crystal displaying portion indicating the similar state to that of FIG. 19.

In executing the operation of S33, the display illustrated in FIG. 20 may be executed in place of the display in FIG. 19. In FIG. 20, a display color of the function "→PC" in the function contents display box 46 is changed to correspond to the progress rate of the function that is now executed. In FIG. 20, the overall function contents display box 46 indicating the function "scan→CARD" is displayed in color different from that of the function contents display box 46 indicating the function "→print" that has not been executed yet, whereby it is suggested that the execution of the function "scan→CARD" has ended. In the first exemplary embodiment, on account of the display of the progress rate of the function in this manner, the user can check a progress of the function that has already been registered for the "user N" key.

In the above process, an example in which three functions ("scan→CARD", "→PC", and "→print") are registered in the function register box 45 of the "user 1" key is described. Various functions can be registered in the function register boxes 45 of the "user 2" key and the "user 3" key respectively.

For example, in the above operation of S3, if it is determined that the "user 2" key is pressed, an editing screen of the "user 2" key is displayed by the above operation of S4. After the editing screen of the "user 2" key is displayed, a plurality of functions can be registered in the function register boxes 45 of the "user 2" key by executing above processes. Therefore, combinations of different functions can be registered for different "user N" keys according to the user preference.

In the first exemplary embodiment, when any "user N" key is selected by the user, the CPU 21 executes two or more user's desired functions (for example, three functions) successively, based on the relationship between the "user N" keys stored in the ROM 22 and the registered function information.

Second Exemplary Embodiment

A second exemplary embodiment will be explained with reference to FIG. 21. In the second exemplary embodiment, the inventive concept of the preset invention is applied to the multifunction apparatus. In the user setting key editing program of the first exemplary embodiment, it is determined whether a dragging operation is made from the function selection key to the function register box (S6). In contrast, the second exemplary embodiment is different in that it is determined whether the function register box and the function selection key are touched by the user. Here, the same reference symbols are affixed to the same configurations and the same processes as those in the first exemplary embodiment, and their explanation will be omitted herein.

Figure 21:
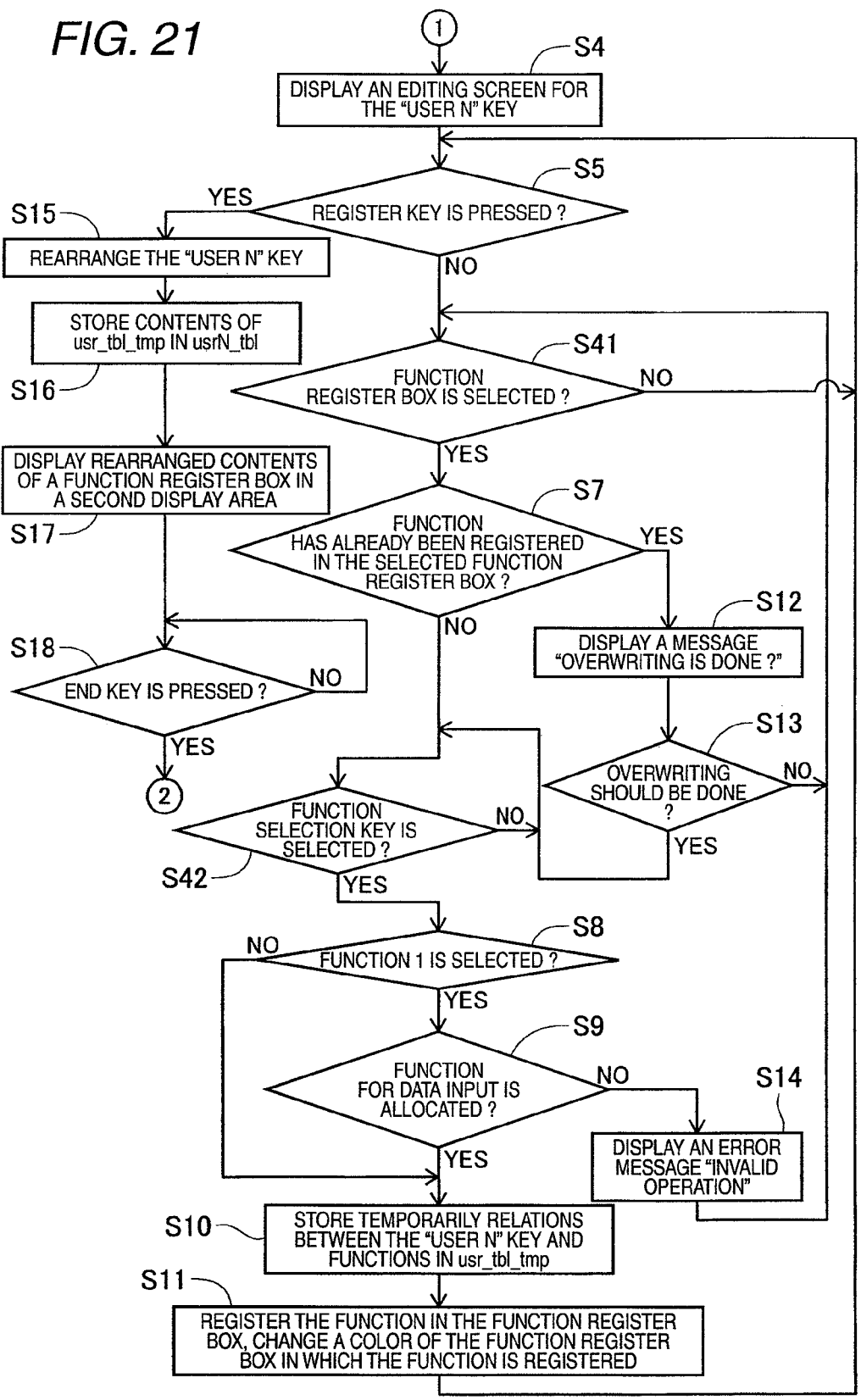
FIG. 21 is a flowchart showing processes executed by a multifunction apparatus according to a second exemplary embodiment of the present invention.

As shown in FIG. 21, if the register key K2 (see FIG. 11) is not pressed by the user (S5: NO), it is determined by the CPU 21 whether the function register box 45 is selected (S41). Here, it is determined which function register box 45 out of the function register boxes 45 ("function 1" to "function 5") is pressed.

If the fiction register box, for example, "function 1" is pressed by the user's finger (S41, YES), the operation of S7 is executed by the CPU 21. Here, it is determined whether the function has already been registered in the function register box "function".

If it is determined that no function is registered in the selected function register box (S7: NO), it is determined by the CPU 21 whether either the function selection key for data input or the function selection key for data output is selected (S42).

If the function selection key for the function, for example, "scan→CARD" is pressed by the user's finger (S42: YES), the above processes subsequent to S8 are executed. At this time, the CPU 21 and the display controlling portion 28 make a display color of the function register box "function 1" different from display colors of other function register boxes ("function 2" to "function").

In the second exemplary embodiment, the function "scan→CARD" is registered in the friction register box "function 1" by the operation of S11. Also, the display color of the friction register box "function 1" is made different from the display colors of other function register boxes ("function 2" to "function 5") by the operation of S11.

In the above operation of S41, if it is determined by the CPU 21 that the function register box 45 is not selected (S41: NO), the process returns to the operation of S5. In the above operation of S42, if it is determined by the CPU 21 that the function selection key is not selected (S42: NO), the operation of S42 is executed repeatedly.

In the above operation of S13, if it is determined by the CPU 21 that the function different from the registered function should be overwritten in the function register box 45 in which the function has already been registered (S13: YES), respective processes subsequent to S42 are executed.

In this manner, in the second exemplary embodiment, it is determined whether the function register box and the function selection key are touched by the user (S41, S42). As a result, the function selection key that the user selects can be registered in the function register box without fail.

Third Exemplary Embodiment

A third exemplary embodiment of the present invention will be explained with reference to FIG. 1 and FIG. 3, and FIG. 22 to FIG. 25. In the third exemplary embodiment, the inventive concept of the present invention is applied to a Personal Computer (CC) 50 and a multifunction apparatus 1A. Here, the same reference symbols are affixed to the same configurations and the same processes as those in the first and second exemplary embodiments, and their explanation will be omitted herein. In the third exemplary embodiment, it is supposed that a symbol "1" of the multifunction apparatus 1 (see FIG. 1) of the first exemplary embodiment should be replaced with a symbol "1A".

Figure 22:
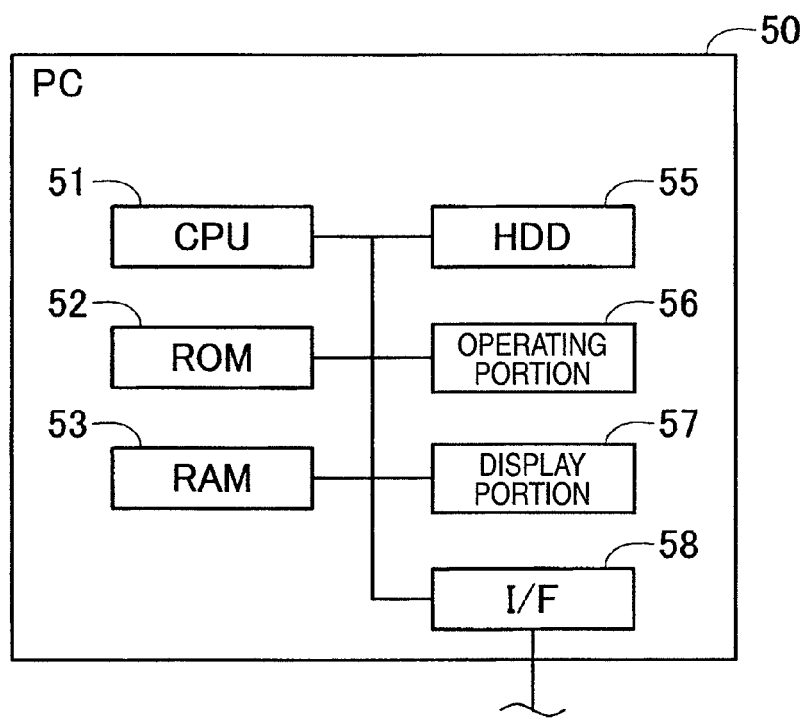
FIG. 22 is a block digram showing an electrical configuration of a personal computer included in an image processing system according to a third exemplary embodiment of the present invention.

As shown in FIG. 22, the PC 50 includes a CPU 51, a ROM 52, a RAM 53, a hard disc drive (HDD) 55, an operating portion 56, a displaying portion 57, and an interface (I/F) 58.

The CPU 51 executes control of respective portions of the PC 50 and respective calculations in accordance with programs stored in the ROM 52, the RAM 53, and the HDD 55 respectively.

The ROM 52 is a memory device that can retain the stored contents even though a power switch of the PC 50 is turned OFF. In the third exemplary embodiment, the ROM 52 is configured by a flash memory.

The RAM 53 is a memory device that is utilized as a main memory that is accessed directly by the CPU 51, or the like.

The HDD 55 is a memory device used to save various programs and various data files. Also, programs for causing the OS and the applications to function are saved in the HDD 55.

The operating portion 56 is an inputting device used to input various instructions from the user. The operating portion 56 is configured by the keyboard and various pointing devices such as the mouse, and the like, for example.

The displaying portion 57 is an outputting device used to present various information to the user. The displaying portion 57 is configured by the liquid crystal display that can display the color image, or the like, for example.

The I/F 58 is a serial interface based on the USB standard. Various devices (for example, printer, keyboard, mouse, scanner, speaker, etc.) can be connected to the I/F 58. In the third exemplary embodiment, a USB terminal 32 of the multifunction apparatus 1A (see FIG. 1 and FIG. 3) is connected to the I/F 58.

As the OS used to control a group of hardware described above, the OS equipped with the multitask function is installed into the PC 50. The multitask function enables the PC to execute the processes based upon plural software in parallel on a time-division basis.

In the PC 50, the user setting key editing program, the user setting key comment displaying program, the user setting key executing program, and the coordinates storing portion are saved in the HDD 55 respectively.

Figure 23:
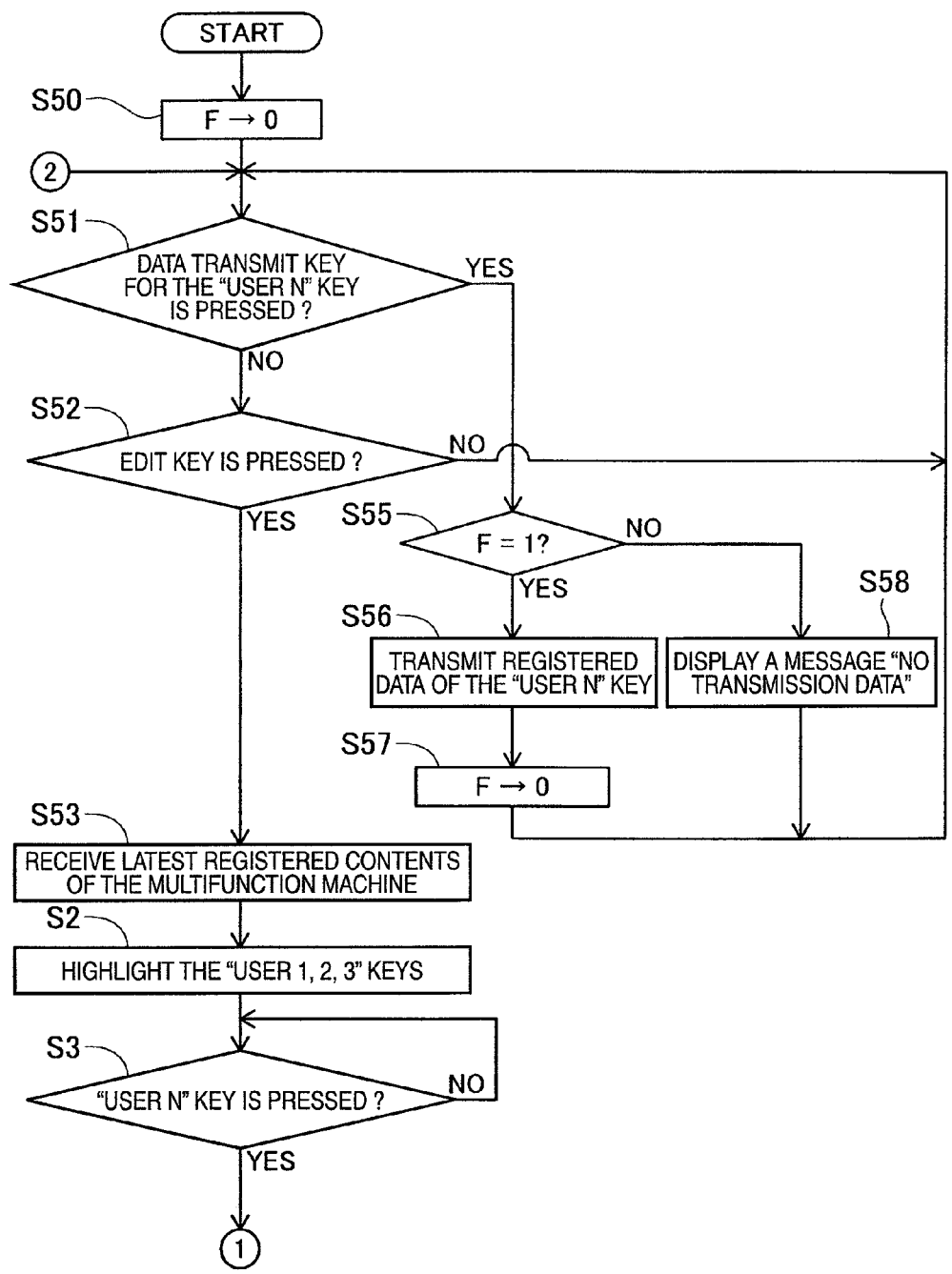
FIG. 23 is a first flowchart showing processes executed by the personal computer.
Figure 24:
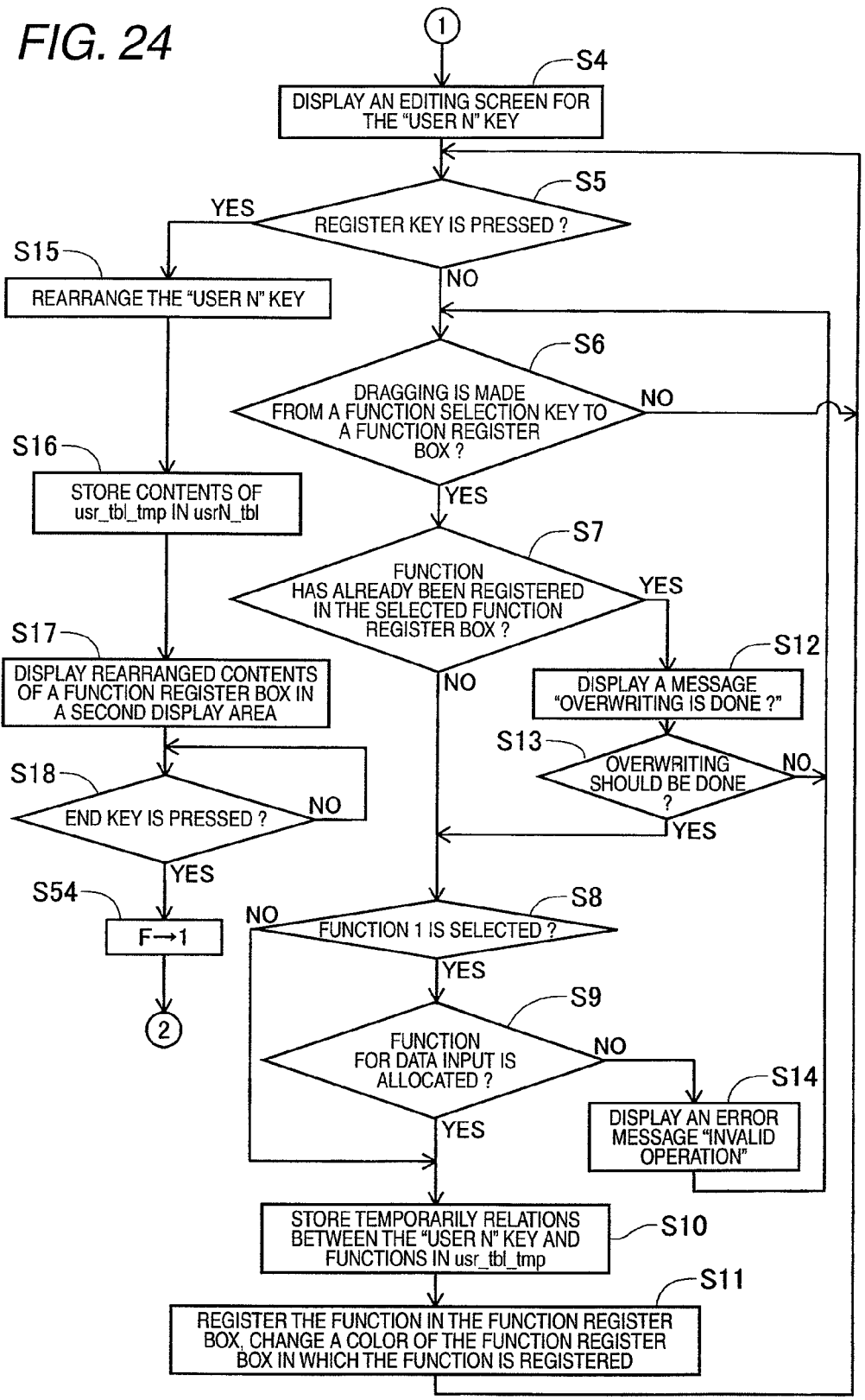
FIG. 24 is a second flowchart showing processes executed by the personal computer.

When a power switch of the PC 50 is turned ON, processes illustrated in FIG. 23 and FIG. 24 are executed in accordance with respective programs such as the user setting key editing program, the user setting key comment displaying program, and the user setting key executing program. As shown in FIG. 23, at first, a data transmission check flag is reset to 0 by the CPU 51 (S50). The data transmission check flag is used to check whether a function ("usrN_tbl" described later) registered for the "user N" key is transmitted to the multifunction apparatus 1A by the PC 50.

After the operation of S50, it is determined by the CPU 51 whether a data transmit key for the "user N" key is pressed (S51). In the third exemplary embodiment, it is determined whether the "data transmit key for the "user N" key" is single-clicked by the mouse (the operating portion 56). Here, the "data transmit key for the "user N" key" is displayed on the display (the displaying portion 57). The "data transmit key for the "user N" key" denotes the key that is used to transmit the function "usrN_tbl", described later, to the multifunction apparatus 1A via the I/F 58.

If it is determined that the "data transmit key for the "user N" key" is not pressed (S51: NO), it is determined by the CPU 51 whether an edit key is pressed (S52). Here, the screens similar to the first display area 42A and the second display area 42B, as shown in FIG. 2, are displayed on the display. In the third exemplary embodiment, it is determined by the CPU 51 whether the edit key K1 (see FIG. 2) is single-clicked by the mouse.

If it is determined that the edit key K1 is pressed (S52: YES), the process of receiving the latest registered contents of the multifunction apparatus 1A is executed (S53). Here, the PC 50 receives all data registered for the "user N" key from the user setting key table storing portion of the multifunction apparatus 1A via the I/F 58.

After the operation of S53, respective processes (S2 to S18) similar to those in the first and second exemplary embodiments are executed.

In the first and second exemplary embodiments, the screens shown in FIG. 10 to FIG. 20 are displayed on the liquid crystal displaying portion 42 of the multifunction apparatus 1 whereas, in the third exemplary embodiment, the screens similar to the first display area 42A and the second display area 42B are displayed on the display of the PC 50 respectively.

If the end key K3 is pressed (S18: YES), a data transmission check flag F is set to 1 (S54). After the operation of S54, the process returns to the operation of S51.

At the operation of S51, if it is determined that the data transmit key for the "user N" key is pressed (S51: YES), it is determined by the CPU 51 whether the data transmission check flag F is set to 1 (S55).

If it is determined that the data transmission check flag F is set to 1 (S55: YES), the registered data ("usrN_tbl") in the "user N" key is transmitted to the multifunction apparatus 1A

(S56). Here, for example, the register function information registered for the "user 1" key is transmitted to the multifunction apparatus 1A by the CPU 51.

After the operation of S56, the data transmission check flag F is reset to 0 by the CPU 51 (S57). After the operation of S56, the process returns to the operation of S51.

In contrast, at the operation of 355, if it is determined that the data transmission check flag F is set to 0 (S55: NO), a message "No transmission data" is displayed on the display of the PC 50 by the CPU 51 (S58). After the operation of S58, the process returns to the operation of S51.

Figure 25:
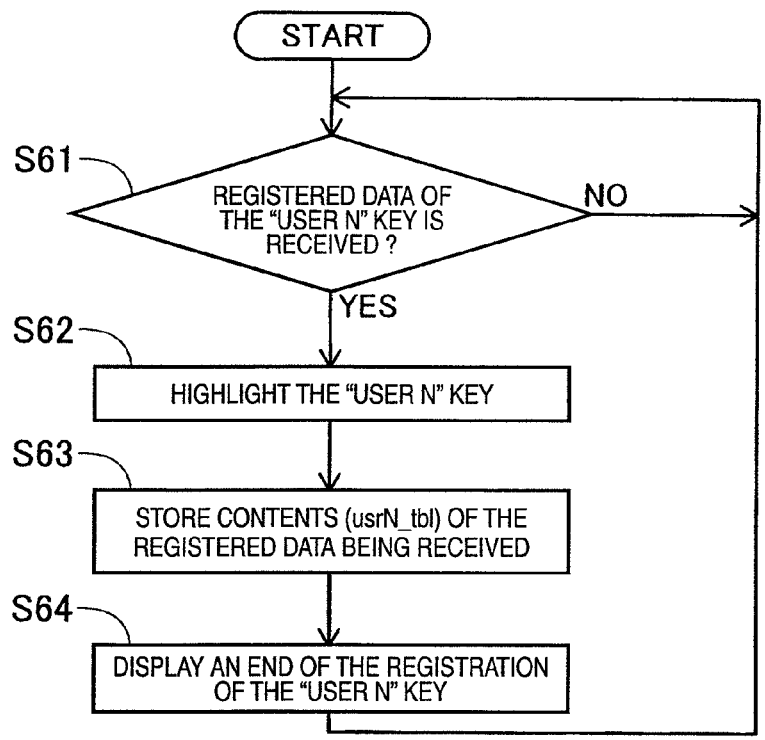
FIG. 25 is a flowchart showing processes executed by a multifunction apparatus included in the image processing system.

The processes shown in FIG. 25 are executed by the CPU 51, and the like, in accordance with the program stored in the ROM 22. When the power switch of the multifunction apparatus 1A is turned ON, it is determined by the CPU 21 whether the registered data of the "user N" key is received, as shown in FIG. 25 (S61). Here, it is determined whether the data being transmitted by the above operation of S56 are received.

If it is decided that the registered data ("usrN_tbl") in the "user N" key is received (S61: YES), the "user N" key is highlighted on the liquid crystal displaying portion 42 of the multifunction apparatus 1A (S62). For example, when the data registered for the "user 1" key to the "user 3" key respectively are received at the operation of S61, the screen similar to that in FIG. 10 is displayed on the liquid crystal displaying portion 42 of the multifunction apparatus 1A by the operation of S62.

After the operation of S62, the contents (usrN_tbl) of the registered data being received by the operation of S61 are stored in the storing area of the user setting key table storing portion 22e by the CPU 21 (S63).

After the operation of S63, the CPU 21 and the display controlling portion 28 display an end of the registration of the "user N" key (S64). Here, a message "End of registration in the "user 1" key to the "user 3" key" is displayed at the top area in the second display area 42B shown in FIG. 10.

After the operation of S64 ends, or if it is determined at S61 that the registered data in the "user N" key is not received (S61: NO), the process returns to the operation of S61.

In the third exemplary embodiment, similarly to the first and second exemplary embodiments, when any "user N" key is selected by the user, the CPU 21 executes two or more user's desired functions (for example, three functions) successively.

In the third exemplary embodiment, the PC 50 receives the registered data of the "user N" key from the multifunction apparatus 1A by the operation of S53, and then it is determined at the operation of S6 whether the dragging is made from any function selection key to the function register box 45 in the second display area 42B.

In this manner, in the image processing system of the third exemplary embodiment, various processing operations composed of combinations of a plurality of processing operation information can be executed. As a result, the usability of the image processing apparatus can be improved.

Also, in the PC 50, the contents (usrN_tbl) of the registered data stored in the storing area of the user setting key table storing portion 22e of the multifunction apparatus 1A are received via the I/F 58, and then the edition of the "user N" key can be executed. Therefore, in editing the "user N" key, the "user N" key can be edited while referring to the contents of the registered data that have already been stored in the storing area of the user setting key table storing portion 22e of the malfunction apparatus 1A.

<Variation>

While the present invention has been shown and described with reference to certain exemplary embodiments thereof, it will be understood by those skilled in the art that various changes in form and details may be made therein without departing from the spirit and scope of the invention as defined by the appended claims.

For example, in the first exemplary embodiment, as shown in FIG. 11 and FIG. 12, one function of the data input system and two functions of the data output system are registered in three function register boxes 45 respectively. In this case, functions in different combinations may be registered in three function register boxes 45.

Unlike the cases in FIG. 11 and FIG. 12, as illustrated in FIG. 26, two functions of the data input system and one function of the data output system may be registered in three function register boxes 45 respectively.

The present invention provides illustrative, non-limiting embodiments as follows:

(1) An image processing apparatus capable of executing a plurality of processing operations on input data, the apparatus includes: a selection detecting unit configured to detect a selecting operation of a plurality of processing operations from among the plurality of processing operations; an operation information storing unit configured to store a plurality of processing operation information for specifying the processing operations detected by the selection detecting unit, respectively; a setting unit configured to set the plurality of processing operation information stored in the operation information storing unit, as a plurality of processing operations which are collectively executed in response to an execution instruction input to an instructing unit; and an executing unit configured to execute the plurality of processing operations corresponding to the plurality of processing operation information set by the setting unit, in response to the execution instruction.

According to the configuration of (1), since a combination of processing operation information being set as the plurality of processing operations can be set freely, various processing operations composed of the combination of a plurality of processing operation information can be executed. As a result, usability of the image processing apparatus can be improved.

(2) The image processing apparatus of (1) may firer include: a selection information storing unit configured to store selection information for specifying the plurality of processing operations which are detactable by the selection detecting unit; and a display controller configured to display the plurality of detectable processing operations corresponding to the selection information stored in the selection information storing unit, in a first display area of a display, and display the plurality of processing operations corresponding to the plurality of processing operation information stored in the operation information storing unit, in a second display area of the display.

According to the configuration of (2), the user can check easily a combination of a plurality of processing operations by deciding the processing operation that is to be selected from a plurality of processing operations, while checking the processing operation detected by the selection detecting means. As a result, an editing work of the combination of a plurality of processing operations can be done effectively.

(3) In the image processing apparatus of (2), the display controller may display, as the plurality of detectable processing operations, a plurality of input operations regarding an input process to accept the input data, in a first partial area of the first display area, and a plurality of output operations regarding an output process to the input data, in a second partial area of the first display area.

According to the configuration of (3), the first display area has a display area in which the input operations regarding the input process are displayed, and the display area in which the output operations regarding the output process are displayed. Therefore, display positions of respective operations are easily discriminated by providing the areas in which different operations are displayed mutually to the first display area. Accordingly, such a situation can be reduced or prevented that the user selects the mutually different operations (input operation, output operation) by mistake.

(4) The image processing apparatus of (2) or (3) may further include a storage controller configured to store the plurality of processing operation information for specifying the processing operations detected by the selection detecting unit into the operation information storing unit. The selection detecting unit may detect a selecting operation of an execution number for each of the plurality of processing operations displayed on the first display area. The storage controller may store each of the execution numbers and corresponding one of processing operation information in associated with each other, in the operation information storing unit. The display controller may arrange the plurality of processing operations in the second display, in accordance with the execution numbers stored in the operation information storing unit.

According to the configuration of (4), the display controller arranges the indications of a plurality of processing operations in the second display area, in accordance with the execution number stored in the operation information storing unit and indicating the sequence of execution of the processing operations. Accordingly, an editing work of the combination of a plurality of processing operations displayed on the second display area can be done by checking the execution numbers of a plurality of processing operations, while looking at the alignment of a plurality of processing operations displayed in the second display area.

(5) In the image processing apparatus of (4), when an output operation regarding an output process to the input data is detected by the selection detecting unit as the processing operation, the execution number of which is earliest, the storage controller may control the operation information storing unit not to store the processing operation information of the output operation.

According to the configuration of (5), an input operation is stored as the processing operation whose execution number is earliest among a plurality of processing operations. Therefore, a series of processing operations can be executed after the input of input data is completed by the input operation whose number of execution is earliest among a plurality of processing operations.

(6) In the image processing apparatus of (4) or (5), when the execution number of the processing operation detected by the selection detecting unit is already stored in the operation information storing unit, the display controller may control the display to display a message indicating whether to store the processing operation detected by the selection detecting unit and the execution number of the processing operation in the operation information storing unit.

According to the configuration of (6), when the execution number of the processing operation detected by the selection detecting unit is already stored in the operation information storing unit, such a situation can be avoided that the processing operation information correlated with the execution number are overwritten inadvertently in the operation information storing unit. Therefore, even though the execution number of the processing operation is detected by mistake by the selection detecting unit, the processing operation information corresponding to the correct execution number can be stored in the operation information storing unit.

(7) In the image processing apparatus of any one of (4) to (6), wherein, when the execution numbers stored in the operation information storing unit are not serial, the setting unit may transform the execution numbers into serial numbers and set the plurality of processing operation information being correlated with the serial numbers.

According to the configuration of (7), such a setting can be provided that a plurality of processing operations are executed continuously without interruption of operation based on a plurality of register function information stored in the operation information storing unit.

(8) The image processing apparatus of (7), may further includes a plurality of instructing units. The setting unit may set a plurality of processing operation information for specifying the processing operations for each of execution instructions from the plurality of instructing units.

According to the configuration of (8), the setting unit can set the different processing operation information for specifying different processing operations respectively for each instructing unit, based on a plurality of processing operation information stored in the operation information storing unit. Therefore, combinations of a plurality of mutually different processing operations can be edited by setting the processing operation information for specifying different processing operations respectively.

(9) An image processing system includes: an information processing apparatus; and an image processing apparatus capable of communicating with the information processing apparatus and capable of executing a plurality of processing operations on input data. The information processing apparatus includes: a selection detecting unit configured to detect a selecting operation of a plurality of processing operation from among the plurality of processing operations; an operation information storing unit configured to store a plurality of processing operation information for specifying the processing operations detected by the selection detecting unit, respectively; a transmitting unit configured to transmit the plurality of processing operation information stored in the operation information storing unit to the image processing apparatus. The image processing apparatus includes: a receiving unit configured to receive the plurality of processing operation information transmitted by the transmitting unit; a setting unit configured to set the plurality of processing operation information received by the receiving unit as a plurality of processing operations which are collectively executed in response to an execution instruction input to an instructing unit; and an executing unit configured to execute the plurality of processing operations corresponding to the plurality of operation information set by the setting unit, in response to the execution instruction.

According to the configuration of (9), since a combination of processing operation information being set as a plurality of processing operations can be set freely, various processing operations composed of the combination of a plurality of processing operation information can be executed. As a result, usability of the image processing apparatus can be improved.

(10) In the image processing system of (9), the information processing apparatus may further include: an acquiring unit configured to acquire the plurality of processing operation information which are set to the instructing unit of the image processing apparatus, and a display controller configured to display the plurality of processing operations which are detectable by the selection detecting unit in a first display area of a display, and the plurality of processing operations corresponding to the plurality of processing operation information acquired by the acquiring unit in a second display area of the display.

According to the configuration of (10), in setting a combination of a plurality of processing operation information, the user can check the processing operation information being set in the instructing unit of the image processing apparatus.

(11) A computer-readable medium having a computer program stored thereon and readable by a computer which is capable of communicating with an image processing apparatus capable of executing a plurality of processing operations on input data, the computer program, when executed by the computer to perform operations include: detecting a selecting operation of a plurality of processing operations from among the plurality of processing operations; storing a plurality of processing operation information for specifying the detected processing operations, respectively; and transmitting the stored plurality of processing operation information to the image processing apparatus.

According to the configuration of (11), when the selecting operation of processing operations is detected, various processing operation information is transmitted to the image processing apparatus.

What is claimed is:

1. An image processing apparatus for executing a plurality of processing operations on input data, the apparatus comprising:
    an operation information storing device configured to store data associated with processing operations; and
    a control device configured to:
        detect a selection of a first group of processing operations from among the plurality of processing operations
        determine whether an input operation is selected as a processing operation to be executed first,
        store the first group of processing operations in the operation information storing device in accordance with the determination;
        receive a first execution instruction, which is associated with the first group; and
        execute all of the processing operations in the first group in response to the first execution instruction, wherein the first group comprises:
            an input operation corresponding to an input process to receive the input data, and
            a plurality of output operations comprising at least two of printing the input data, sending the input data via facsimile, transmitting the input data to a memory card, and transmitting the input data to an external terminal,
    wherein, when it is determined that a first processing operation which is not an input operation is selected as the processing operation to be executed first, the first processing operation is not stored in the information storing device as the processing operation to be executed first, and
    wherein, when it is determined that a second processing operation which is an input operation is selected as the processing operation to be executed first, the second processing operation is stored in the information storing device as the processing operation to be executed first.

2. The image processing apparatus according to claim 1, further comprising:
    a selection information storing device configured to store selection information for specifying the plurality of processing operations which are detectable by the control device; and
    a display controller configured to display
        the plurality of detectable processing operations corresponding to the selection information stored in the selection information storing device, in a first display area of a display, and
        the first group in a second display area of the display.

3. The image processing apparatus according to claim 2 wherein the display controller displays, as the plurality of detectable processing operations,
    a plurality of input operations regarding an input process to accept the input data, in a first partial area of the first display area, and
    a plurality of output operations regarding an output process to the input data, in a second partial area of the first display area.

4. The image processing apparatus according to claim 2, further comprising a storage controller configured to control the operation information storing device,
    wherein the control device is further configured to detect a selecting operation of an execution number for each of the plurality of processing operations displayed on the first display area,
    wherein the storage controller stores each of the execution numbers and corresponding one of processing operation information associated with each other, in the operation information storing device, and
    wherein the display controller arranges the plurality of processing operations in the second display, in accordance with the execution numbers stored in the operation information storing device.

5. The image processing apparatus according to claim 4, wherein, when the execution number of the processing operation detected is already stored in the operation information storing device, the display controller controls the display to display a message indicating whether to store the processing operation detected and the execution number of the processing operation in the operation information storing device.

6. The image processing apparatus according to claim 4, wherein, when the execution numbers stored in the operation information storing device are not serial, the control device transforms the execution numbers into serial numbers and sets the plurality of processing operation information being correlated with the serial numbers.

7. The image processing apparatus according to claim 6, wherein the control device is further configured to:
    receive a second execution instruction, which is associated with a second group of processing operations, each processing operation of the second group corresponding to an execution number; and
    execute all of the processing operations in the second group in the order of their corresponding execution numbers, in response to the second execution instruction.

8. The image processing apparatus according to claim 1, further comprising a display controller,
    wherein, when no processing operations are associated with the first execution instruction, the display controller is configured to display an error message on a display.

9. The Image processing apparatus according to claim 1, further comprising a display controller
    a key configured to be manipulated by a user,
    wherein the display controller is configured to display contents of the selected processing operation when a first type of manipulation is performed to the key, and
    wherein the control device is configured to execute all of the processing operations in the first group when a second type of manipulation, which is different from the first manipulation, is performed to the key.

10. The image processing apparatus according to claim 1, wherein the input operation is one of accepting the input data from a scanning device, via facsimile and from a memory card.

11. The image processing apparatus according to claim 1, wherein the input operation includes both an operation of receiving the input data input to the image processing apparatus and an operation of performing a predetermined process to the input data, and
wherein the output operation includes performing a predetermined process to the input data.

12. An image processing system comprising:
an information processing apparatus; and
an image processing apparatus configured to communicate with the information processing apparatus and configured to execute a plurality of processing operations on input data,
wherein the information processing apparatus includes:
  an operation information storing device configured to store data associated with processing operations and; and
  a first control device configured to:
    detect a selection of a first group of processing operations from among the plurality of processing operations;
    determine whether an input operation is selected as a processing operation to be executed first;
    store the first group of processing operations in the operation information storing device in accordance with the determination; and
    transmit the first group of processing operations to the image processing apparatus,
wherein the image processing apparatus includes:
  a second control device configured to:
    receive the first group processing operations transmitted by the first control device; and
    receive a first execution instruction, which is associated with the first group; and
    execute all of the processing operations in the first group in the arranged order, in response to the first execution instruction,
wherein the first group comprises:
  an input operation corresponding to an input process to receive the input data, and
  a plurality of output operations comprising at least two of printing the input data, sending the input data via facsimile, transmitting the input data to a memory card, and transmitting the input data to an external terminal,
wherein, when it is determined that a first processing operation which is not an input operation is selected as the processing operation to be executed first, the first processing operation is not stored in the information storing device as the processing operation to be executed first, and
wherein, when it is determined that a second processing operation which is an input operation is selected as the processing operation to be executed first, the second processing operation is stored in the information storing device as the processing operation to be executed first.

13. The image processing system according to claim 12, wherein the first control device is further configured to:
acquire the first group associated with the first execution instruction, and
wherein the information processing apparatus further includes a display controller configured to display
the plurality of processing operations which are detectable by the first control device in a first display area of a display, and
the processing operations in the first group acquired by the first control device in a second display area of the display.

14. The image processing system according to claim 12, wherein the input operation is one of accepting the input data from a scanning device, via facsimile and from a memory card.

15. The image processing system according to claim 12, wherein the input operation includes both an operation of receiving the input data input to the image processing apparatus and an operation of performing a predetermined process to the input data, and
wherein the output operation includes performing a predetermined process to the input data.

16. A non-transitory computer-readable medium having a computer program stored thereon and readable by a computer which is configured to communicate with an image processing apparatus configured to execute a plurality of processing operations on input data, the computer program, when executed by the computer to perform operations comprising:
detecting a selection of a first group of processing operations from among the plurality of processing operations
determining whether an input operation is selected as an processing operation to be executed first,
storing the arranged first group of processing operations in accordance with the determination;
transmitting the first group of processing operations arranged in the order of the corresponding execution numbers to the image processing apparatus,
wherein the first group comprises:
an input operation corresponding to an input process to receive the input data, and
a plurality of output operations comprising at least two of printing the input data, sending the input data via facsimile, transmitting the input data to a memory card, and transmitting the input data to an external terminal,
wherein, when it is determined that a first processing operation which is not an input operation is selected as the processing operation to be executed first, the first processing operation is not stored as the processing operation to be executed first, and
wherein, when it is determined that a second processing operation which is an input operation is selected as the processing operation to be executed first, the second processing operation is stored as the processing operation to be executed first.

17. The non-transitory computer readable medium according to claim 16,
wherein the input operation is one of accepting the input data from a scanning device, via facsimile and from a memory card.

18. The non-transitory computer readable medium according to claim 16,
wherein the input operation includes both an operation of receiving the input data input to the image processing apparatus and an operation of performing a predetermined process to the input data, and
wherein the output operation includes performing a predetermined process to the input data.

* * * * *